(12) United States Patent
Guo et al.

(10) Patent No.: US 12,567,748 B2
(45) Date of Patent: Mar. 3, 2026

(54) POWER CONVERTER AND PROTECTION METHOD FOR SHORT CIRCUIT TO GROUND ON DIRECT CURRENT SIDE THEREOF

(71) Applicant: Huawei Digital Power Technologies Co., Ltd., Shenzhen (CN)

(72) Inventors: Kai Guo, Shanghai (CN); Houjian Xu, Shanghai (CN); Xiaoxiang Zhou, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 210 days.

(21) Appl. No.: 18/583,016

(22) Filed: Feb. 21, 2024

(65) Prior Publication Data

US 2024/0305109 A1 Sep. 12, 2024

(30) Foreign Application Priority Data

Mar. 9, 2023 (CN) .......................... 202310255434.5
Dec. 29, 2023 (CN) .......................... 202311865529.5

(51) Int. Cl.
*H02J 3/38* (2006.01)
*H02J 3/388* (2026.01)
*H02M 7/483* (2007.01)
*H02M 7/5387* (2007.01)

(52) U.S. Cl.
CPC .......... *H02J 3/388* (2020.01); *H02M 7/4835* (2021.05); *H02M 7/53873* (2013.01)

(58) Field of Classification Search
CPC ... H02J 3/388; H02M 7/4835; H02M 7/53873
See application file for complete search history.

(56) References Cited

U.S. PATENT DOCUMENTS

| | | | | |
|---|---|---|---|---|
| 11,515,709 B2 * | 11/2022 | Mao | ........................ | H02J 3/388 |
| 2012/0175964 A1 * | 7/2012 | Yoscovich | ................ | H02J 3/00 |
| | | | | 307/82 |
| 2017/0264221 A1 | 9/2017 | Cash | | |
| 2020/0366079 A1 | 11/2020 | Telefus et al. | | |
| 2021/0063494 A1 | 3/2021 | Katsukura et al. | | |

(Continued)

FOREIGN PATENT DOCUMENTS

| | | |
|---|---|---|
| CN | 102967766 B | 8/2015 |
| CN | 108242884 B | 3/2020 |

(Continued)

*Primary Examiner* — Scott Bauer
(74) *Attorney, Agent, or Firm* — Maier & Maier, PLLC

(57) ABSTRACT

A power converter includes a power conversion circuit, a relay, and a controller. The power conversion circuit can be configured to implement conversion from a direct current to an alternating current. The relay can be configured to implement on-grid and off-grid switching. The controller can be configured to control switch-on/off of switches in the power conversion circuit and the relay. When a positive direct current bus has a short circuit to ground, the controller switches off a relay of a corresponding phase when any phase of grid voltage is negative. When a negative direct current bus has a short circuit to ground, the controller switches off a relay of a corresponding phase when any phase of grid voltage is positive.

20 Claims, 10 Drawing Sheets

(56)         References Cited

U.S. PATENT DOCUMENTS

| | | | | | |
|---|---|---|---|---|---|
| 2022/0392726 | A1* | 12/2022 | Terashima | ............. | H02H 3/093 |
| 2023/0113216 | A1* | 4/2023 | Wang | ................ | G01R 19/0084 |
| | | | | | 307/82 |
| 2023/0275422 | A1* | 8/2023 | Holveck | ................. | H02H 7/20 |
| | | | | | 361/87 |

FOREIGN PATENT DOCUMENTS

| | | | |
|---|---|---|---|
| EP | 4113775 | A1 | 1/2023 |
| JP | H09285015 | A | 10/1997 |

* cited by examiner

3L NPC

3L ANPC

3L TNPC

POWER CONVERTER AND PROTECTION METHOD FOR SHORT CIRCUIT TO GROUND ON DIRECT CURRENT SIDE THEREOF

CROSS-REFERENCE TO RELATED APPLICATIONS

This application claims priority to Chinese Patent Application No. 202311865529.5, filed on Dec. 29, 2023 and Chinese Patent Application No. 202310255434.5, filed on Mar. 9, 2023. Both of the aforementioned applications are hereby incorporated by reference in their entireties.

TECHNICAL FIELD

The embodiments relate to the field of photovoltaic power generation, and to a power converter, a protection method for a short circuit to ground on a direct current side thereof, and an energy storage system.

BACKGROUND

A grid-connected inverter is a special inverter. In addition to converting a direct current into an alternating current and supplying power to a load, the grid-connected inverter may further feed back an output alternating current to a grid. Therefore, the grid-connected inverter is often used in a power system in which some direct current voltage sources (such as solar panels or small wind turbines) are connected to the grid. In a grid-connected photovoltaic inverter system, a direct current side of the inverter is connected to a photovoltaic module, an alternating current side of the inverter is connected to a transformer, and the transformer transforms an alternating current output by the inverter and then connects to the grid. When a neutral wire of the transformer is grounded, once a positive direct current bus or a negative direct current bus has a short circuit to ground, a short-circuit current loop is formed between the direct current bus, the earth, and the transformer. If a short-circuit current is not blocked in a timely manner, the short-circuit current increases uncontrollably, which finally causes damage to a related component like the inverter in the power system, and even causes a safety accident. Therefore, it is important to identify, in a timely manner, a short circuit to ground of a positive bus or a negative bus on a direct current side of an inverter, and implement reliable cut-off of a short-circuit current.

Therefore, in the industry, an anti-reverse diode whose conduction direction is the same as a power current flow direction can be disposed on the positive bus or the negative bus on the direct current side of the inverter to block the short-circuit current. However, such a solution has relatively low efficiency and relatively large loss, which is not conducive to improving working efficiency of an entire power generation system.

SUMMARY

To resolve the foregoing problem, embodiments provide a power converter and a protection method for a short circuit to ground on a direct current side thereof. The power converter does not need to be provided with an anti-reverse diode or another protection circuit at a direct current input terminal of the power converter, and can implement reliable switch-off when a short circuit to ground occurs on a positive direct current bus or a negative direct current bus, thereby greatly reducing hardware costs.

According to a first aspect, an embodiment provides a power converter. The power converter includes a positive direct current bus, a negative direct current bus, a power conversion circuit, a relay, and a controller. A direct current input terminal of the power conversion circuit is configured to be connected to a photovoltaic module or an energy storage battery through the positive direct current bus and the negative direct current bus, and an alternating current output terminal of the power conversion circuit is configured to be connected to a grid through the relay. The controller is configured to: in response to the positive direct current bus having a short circuit to ground, when a grid voltage is in a positive half cycle, control the relay to be switched on, and when the grid voltage is in a negative half cycle, control the relay to be switched off. With such an arrangement, the relay may be switched off when there is no short-circuit current between the earth, the positive direct current bus, and the power conversion circuit, thereby avoiding relay sticking and ensuring reliable switch-off of the power converter. In addition, the controller is further configured to: in response to the negative direct current bus having a short circuit to ground, when the grid voltage is in the negative half cycle, control the relay to be switched on, and when the grid voltage is in the positive half cycle, control the relay to be switched off. Based on a same principle, with such an arrangement, the relay may be switched off when there is no short-circuit current between the earth, the negative direct current bus, and the power conversion circuit, thereby avoiding relay sticking and ensuring reliable switch-off of the power converter.

In a possible implementation, the power conversion circuit includes a switch bridge arm. The switch bridge arm includes an upper half bridge arm and a lower half bridge arm. The upper half bridge arm is connected to the positive direct current bus, and the lower half bridge arm is connected to the negative direct current bus. Both the upper half bridge arm and the lower half bridge arm include at least one semiconductor switch. The controller is configured to: in response to the positive direct current bus having a short circuit to ground, first switch off the semiconductor switch of the upper half bridge arm, and then switch off the relay when the grid voltage is in the negative half cycle. With such an arrangement, when the positive direct current bus has a short circuit to ground, a short-circuit current can be prevented from flowing through the semiconductor switch of the upper half bridge arm of the power conversion circuit, thereby preventing the semiconductor switch from being damaged due to impact of the short-circuit current. In addition, the controller may be further configured to: in response to the negative direct current bus having a short circuit to ground, first switch off the semiconductor switch of the lower half bridge arm, and then switch off the relay when the grid voltage is in the positive half cycle. Based on a same principle, with such an arrangement, when the negative direct current bus has a short circuit to ground, a short-circuit current can be prevented from flowing through the semiconductor switch of the lower half bridge arm of the power conversion circuit, thereby preventing the semiconductor switch from being damaged due to impact of the short-circuit current.

In a possible implementation, the controller is configured to: in response to the positive direct current bus having a short circuit to ground, first switch off all semiconductor switches of the power conversion circuit, and then switch off the relay when the grid voltage is in the negative half cycle.

With such an arrangement, when the positive direct current bus has a short circuit to ground, a short-circuit current can be prevented from flowing through the upper half bridge arm of the power conversion circuit, and switch-off logic of the relay is simple. In addition, the controller is further configured to: in response to the negative direct current bus having a short circuit to ground, first switch off all semiconductor switches of the power converter, and then switch off the relay when the grid voltage is in the positive half cycle. Based on a same principle, with such an arrangement, when the negative direct current bus has a short circuit to ground, a short-circuit current can be prevented from flowing through the lower half bridge arm of the power conversion circuit, and switch-off logic of the relay is simple.

In a possible implementation, the relay includes a phase-A relay, a phase-B relay, and a phase-C relay. The power conversion circuit includes a phase-A bridge arm, a phase-B bridge arm, and a phase-C bridge arm. Three phases of bridge arms output alternating currents that have a same frequency and phase as a phase-A grid, a phase-B grid, and a phase-C grid respectively through switch-on/off of transistors. Two ends of the phase-A relay, the phase-B relay, and the phase-C relay are respectively connected to an alternating current output terminal of the phase-A bridge arm and the phase-A grid, an alternating current output terminal of the phase-B bridge arm and the phase-B grid, an alternating current output terminal of the phase-C bridge arm and the phase-C grid.

The controller is configured to: in response to the positive direct current bus having a short circuit to ground, switch off the phase-A relay when a phase-A grid voltage is in the negative half cycle; switch off the phase-B relay when a phase-B grid voltage is in the negative half cycle; and switch off the phase-C relay when a phase-C grid voltage is in the negative half cycle. In other words, the controller performs time-based switch-off on the phase-A relay, the phase-B relay, and the phase-C relay, to ensure that each phase of output terminal of the power converter can be effectively disconnected from the grid, thereby avoiding damage caused by a short-circuit current to the power converter and other components.

In addition, the controller may be further configured to: in response to the negative direct current bus having a short circuit to ground, switch off the phase-A relay when the phase-A grid voltage is in the positive half cycle; switch off the phase-B relay when the phase-B grid voltage is in the positive half cycle; and switch off the phase-C relay when the phase-C grid voltage is in the positive half cycle. In other words, the controller performs time-based switch-off on the phase-A relay, the phase-B relay, and the phase-C relay, to ensure that each phase of output terminal of the power converter can be effectively disconnected from the grid, thereby avoiding damage caused by a short-circuit current to the power converter and other devices.

In a possible implementation, the controller is configured to immediately switch off the relay in response to neither the positive direct current bus nor the negative direct current bus having a short circuit to ground, and a value of a current flowing through at least one semiconductor switch in the power conversion circuit being greater than a preset value. With such an arrangement, when neither the positive direct current bus nor the negative direct current bus has a short circuit to ground, a current loop may be cut off in a timely manner when the current flowing through the power conversion circuit exceeds a preset value, thereby avoiding damage caused by a large current to the semiconductor switch.

In a possible implementation, the controller is configured to: switch off the phase-A relay in response to the positive direct current bus having a short circuit to ground, and duration for which the phase-A grid voltage is in the negative half cycle for the first time being greater than minimum duration for switching off the phase-A relay; and in response to the duration for which the phase-A grid voltage is in the negative half cycle for the first time being less than the minimum duration for switching off the phase-A relay, switch off the phase-A relay when the phase-A grid voltage is in the negative half cycle again. The controller is configured to: switch off the phase-B relay in response to the positive direct current bus having a short circuit to ground, and duration for which the phase-B grid voltage is in the negative half cycle for the first time being greater than minimum duration for switching off the phase-B relay; and in response to the duration for which the phase-B grid voltage is in the negative half cycle for the first time being less than the minimum duration for switching off the phase-B relay, switch off the phase-B relay when the phase-B grid voltage is in the negative half cycle again. The controller is configured to: switch off the phase-C relay in response to the positive direct current bus having a short circuit to ground, and duration for which the phase-C grid voltage is in the negative half cycle for the first time being greater than minimum duration for switching off the phase-C relay; and in response to the duration for which the phase-C grid voltage is in the negative half cycle for the first time being less than the minimum duration for switching off the phase-C relay, switch off the phase-C relay when the phase-C grid voltage is in the negative half cycle again. With such an arrangement, it can be ensured that the relay has sufficient time to implement switch-off, thereby further ensuring reliability of relay switch-off, and preventing the power converter and other components from being damaged by a short-circuit current.

In a possible implementation, the controller is configured to: switch off the phase-A relay in response to the negative direct current bus having a short circuit to ground, and duration for which the phase-A grid voltage is in the positive half cycle for the first time being greater than minimum duration for switching off the phase-A relay; and in response to the duration for which the phase-A grid voltage is in the positive half cycle being less than the minimum duration for switching off the phase-A relay, switch off the phase-A relay when the phase-A grid voltage is in the positive half cycle again. The controller is configured to: switch off the phase-B relay in response to the negative direct current bus having a short circuit to ground, and duration for which the phase-B grid voltage is in the positive half cycle for the first time being greater than minimum duration for switching off the phase-B relay; and in response to the duration for which the phase-B grid voltage is in the positive half cycle being less than the minimum duration for switching off the phase-B relay, switch off the phase-B relay when the phase-B grid voltage is in the positive half cycle again. The controller is configured to: switch off the phase-C relay in response to the negative direct current bus having a short circuit to ground, and duration for which the phase-C grid voltage is in the positive half cycle for the first time being greater than minimum duration for switching off the phase-C relay; and in response to the duration for which the phase-C grid voltage is in the positive half cycle being less than the minimum duration for switching off the phase-C relay, switch off the phase-C relay when the phase-C grid voltage is in the positive half cycle again. With such an arrangement, it can be ensured that the relay has sufficient time to implement switch-off, thereby further ensuring reliability of relay switch-off, and preventing the power converter and other components from being damaged by a short-circuit current.

According to a second aspect, an embodiment provides a protection method for a short circuit to ground on a direct current side of a power converter. The method includes: when a positive direct current bus has a short circuit to ground, switching off a relay when a grid voltage is in a negative half cycle. With such an arrangement, the relay may be switched off when there is no short-circuit current between the earth, the positive direct current bus, and a power conversion circuit, thereby avoiding relay sticking and ensuring reliable switch-off of the power converter. When the negative direct current bus has a short circuit to ground, the relay is switched off when the grid voltage is in a positive half cycle. Based on a same principle, with such an arrangement, the relay may be switched off when there is no short-circuit current between the earth, the negative direct current bus, and the power conversion circuit, thereby avoiding relay sticking and ensuring reliable switch-off of the power converter. In other words, time-based switch-off is performed on the relay, to ensure that each phase of output terminal of the power converter can be effectively disconnected from the grid, thereby avoiding damage caused by a short-circuit current to the power converter and other components. A photovoltaic module is connected to a direct current input terminal of the power conversion circuit through the positive direct current bus and the negative direct current bus, an alternating current output terminal of the power conversion circuit is connected to one end of the relay, and the other end of the relay is connected to a grid.

In a possible implementation, when the positive direct current bus has a short circuit to ground, a semiconductor switch of an upper half bridge arm of the power conversion circuit is switched off. With such an arrangement, when the positive direct current bus has a short circuit to ground, a short-circuit current can be prevented from flowing through the semiconductor switch of the upper half bridge arm of the power conversion circuit, thereby preventing the semiconductor switch from being damaged due to impact of the short-circuit current. In addition, when the negative direct current bus has a short circuit to ground, a semiconductor switch of a lower half bridge arm of the power conversion circuit is switched off. Based on a same principle, with such an arrangement, when the negative direct current bus has a short circuit to ground, a short-circuit current can be prevented from flowing through the semiconductor switch of the lower half bridge arm of the power conversion circuit, thereby preventing the semiconductor switch from being damaged due to impact of the short-circuit current. The upper half bridge arm of the power conversion circuit is connected to the positive direct current bus, and the lower half bridge arm of the power conversion circuit is connected to the negative direct current bus.

In a possible implementation, when the positive direct current bus has a short circuit to ground, all semiconductor switches of the power conversion circuit are first switched off, and then the relay is switched off when the grid voltage is in the negative half cycle. With such an arrangement, when the positive direct current bus has a short circuit to ground, a short-circuit current can be prevented from flowing through the semiconductor switch of the upper half bridge arm of the power conversion circuit, thereby preventing the semiconductor switch from being damaged due to impact of the short-circuit current. In addition, switch-off logic of the relay is simple. In addition, when the negative direct current bus has a short circuit to ground, all semiconductor switches of the power conversion circuit are first switched off, and then the relay is switched off when the grid voltage is in the positive half cycle. Based on a same principle, with such an arrangement, when the negative direct current bus has a short circuit to ground, a short-circuit current can be prevented from flowing through the semiconductor switch of the lower half bridge arm of the power conversion circuit, thereby preventing the semiconductor switch from being damaged due to impact of the short-circuit current. In addition, switch-off logic of the relay is simple. The upper half bridge arm of the power conversion circuit is connected to the positive direct current bus, and the lower half bridge arm of the power conversion circuit is connected to the negative direct current bus.

In a possible implementation, when the positive direct current bus has a short circuit to ground, if duration for which the grid voltage is in the negative half cycle for the first time is greater than minimum duration for switching off the relay, the relay is immediately switched off; and if the duration for which the grid voltage is in the negative half cycle is less than the minimum duration for switching off the relay, the relay is switched off again when the grid voltage is in the negative half cycle again. With such an arrangement, it can be ensured that the relay has sufficient time to implement switch-off, thereby further ensuring reliability of relay switch-off, and preventing the power converter and other components from being damaged by a short-circuit current.

In a possible implementation, when the negative direct current bus has a short circuit to ground, if duration for which the grid voltage is in the positive half cycle for the first time is greater than minimum duration for switching off the relay, the relay is immediately switched off; and if the duration for which the grid voltage is in the positive half cycle is less than the minimum duration for switching off the relay, the relay is switched off when the grid voltage is in the positive half cycle again. With such an arrangement, it can be ensured that the relay has sufficient time to implement switch-off, thereby further ensuring reliability of relay switch-off, and preventing the power converter and other components from being damaged by a short-circuit current.

In a possible implementation, when a current flowing through at least one semiconductor switch in the power conversion circuit is greater than a threshold, and neither the positive direct current bus nor the negative direct current bus has a short circuit to ground, the relay is immediately switched off. In this case, it indicates that the power converter only has an overcurrent fault, but the direct current side has no short-circuit fault. Therefore, the controller immediately switches off the relay to eliminate the overcurrent fault as soon as possible.

Thus, the power converter in the embodiments does not need to be provided with an anti-reverse diode on the direct current side of the power converter, to implement timely and reliable switch-off of the power converter when the direct current side of the power converter has a short-circuit fault. Therefore, material costs are greatly reduced, energy waste generated when a current flows through the anti-reverse diode is avoided, and energy conversion efficiency is improved.

DETAILED DESCRIPTION OF EMBODIMENTS

As described in the Background, for a grid-connected inverter, in a scenario in which a neutral wire of a transformer is grounded, when a positive direct current bus or a negative direct current bus has a short circuit to ground, a short-circuit current loop is formed between the inverter, the earth, and the transformer. If a short-circuit current is not blocked in a timely manner, the short-circuit current increases uncontrollably and causes damage to a component like the inverter.

Figure 1:
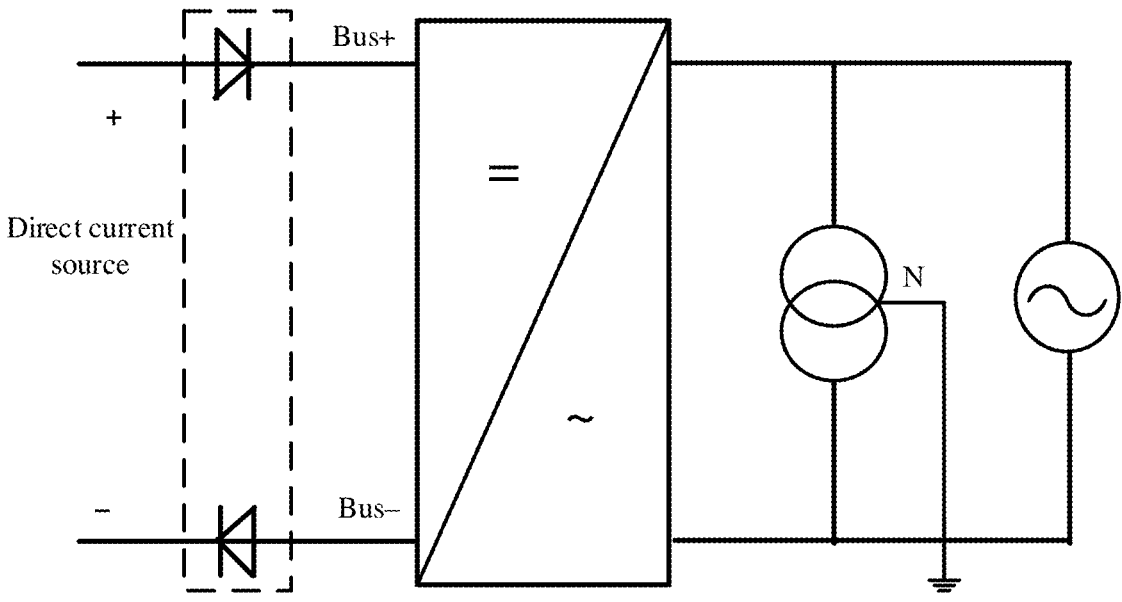
FIG. 1 is a diagram of an architecture of a photovoltaic power generation system.

Therefore, as shown in FIG. 1, in the industry, a diode whose conduction direction is consistent with a power current flow direction can be disposed on each of the positive direct current bus and the negative direct current bus, which is referred to as an anti-reverse diode for short below, to block the short-circuit current. It should be noted that, on the positive direct current bus, a flow direction of a power current is from a direct current source to the inverter, and on the negative direct current bus, the flow direction of the power current is from the inverter to the direct current source.

However, this solution has two main problems. First, due to a relatively high voltage and a relatively large current of the direct current bus, an anti-reverse diode located on the direct current bus is required to have a relatively large current conduction capability and voltage resistance, resulting in an increase in costs of the diode. Second, due to a relatively large current passing through the direct current bus, when the anti-reverse diode is switched on, an additional loss is generated, resulting in reduced efficiency of the inverter.

Therefore, to reduce hardware costs and improve working efficiency of the inverter, for a system without an anti-reverse diode or another protection circuit on a direct current side of the inverter, embodiments provide a method for ensuring reliable switch-off of the inverter when the direct current side of the inverter has a short circuit to ground. The following provides detailed descriptions with reference to FIG. 2 to FIG. 7.

Figure 2:
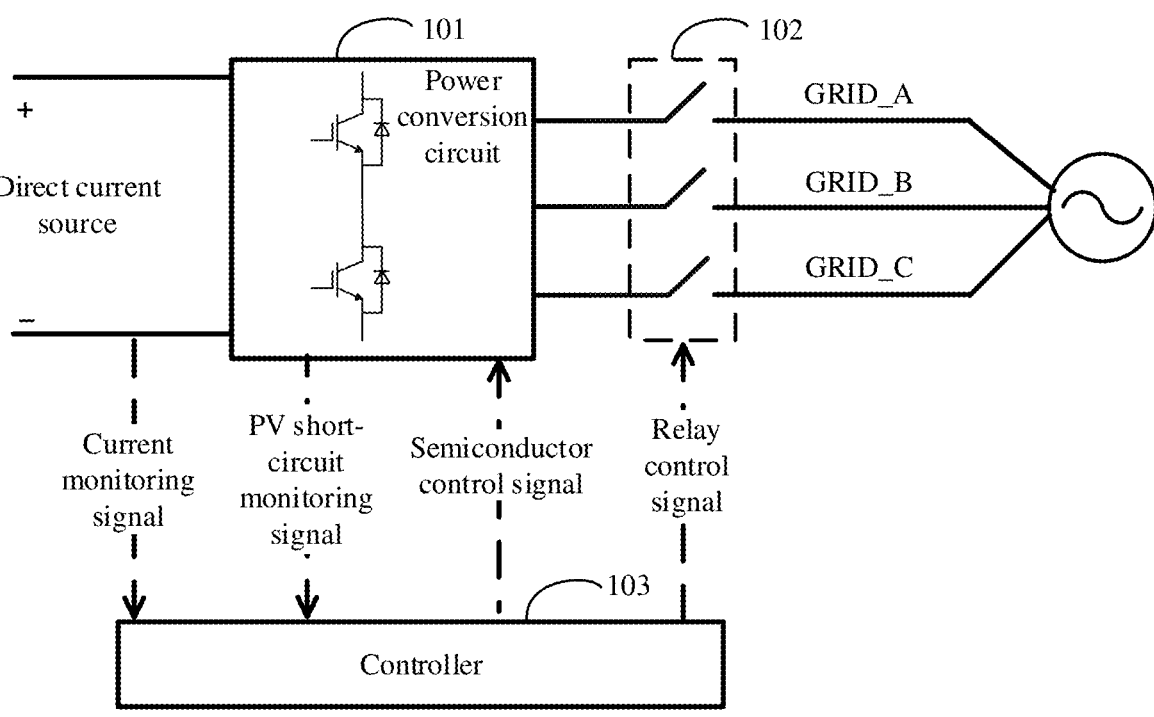
FIG. 2 is a diagram of a protection method for a short circuit to ground on a direct current side of an inverter according to the embodiments.

First, FIG. 2 shows an architecture of a grid-connected photovoltaic system according to an embodiment and is a control logic diagram for ensuring that an inverter is reliably switched off when a direct current bus of the inverter has a short circuit to ground. In a normal grid-connected scenario, a working principle of the system is as follows: a direct current source transmits a direct current to an inverter, and after the inverter converts the direct current into an alternating current, the alternating current is transformed by a transformer, and further transmits electric energy to a grid or a load. The direct current source may be a photovoltaic module or an energy storage battery, and the inverter includes a power conversion circuit 101, a relay 102, and a controller 103.

In the inverter, an alternating current output terminal of the power conversion circuit 101 is connected to the relay 102, and each phase of output terminal of the power conversion circuit 101 is connected to one or more relays in the relay 102. In the power conversion circuit 101, a bridge arm that outputs an alternating current that has a same frequency and phase as a phase-X grid is denoted as a phase-X (X=A, B, and C) bridge arm. A relay connected to an output terminal of the phase-X bridge arm is denoted as a phase-X relay. For example, the power conversion circuit 101 is configured to implement conversion from a direct current to an alternating current, and includes a two-level structure, a three-level structure, a multi-level structure, or the like. In addition, the relay 102 can be configured to control on-grid and off-grid of the entire inverter. Therefore, the relay 102 may be replaced with another device that can change a circuit connection and disconnection function. The controller 103 can be configured to control states of switches in the power conversion circuit 101 and the relay 102. The controller 103 may be connected to the power conversion circuit 101 and the relay 102 in an electrical or wireless manner. This is not limited.

In addition, the inverter further includes a current detection circuit and a short-circuit detection circuit that are not shown in the figure. The current detection circuit can be configured to: identify whether the inverter has an overcurrent fault, and report corresponding current detection information to the controller 103. For example, the current detection circuit may determine, by detecting a magnitude of a current flowing through a semiconductor switch, whether the inverter has the overcurrent fault. In addition, the short-circuit detection circuit is configured to: identify whether a direct current bus has a short circuit to ground, and report status information between the direct current bus and the earth to the controller 103. For example, the short-circuit detection circuit may determine, by detecting whether there is impedance between the positive/negative direct current bus and the earth and between the earth and a point having a same potential as the positive/negative direct current bus, whether the positive/negative direct current bus has a short circuit to ground. In other words, the short-circuit detection circuit can be configured to: determine a state between the direct current bus and the earth, which includes three types: the positive direct current bus having a short circuit to ground, the negative direct current bus having a short circuit to ground, and no direct current bus having a short circuit to ground, and report a determining result to the controller 103.

For example, when a current flowing through at least one semiconductor switch in the power conversion circuit exceeds a set threshold, an overcurrent protection action of the inverter is triggered, and the controller 103 switches off semiconductor switches of all bridge arms in the power conversion circuit 101. Further, the controller 103 controls, based on a short-circuit fault type of the direct current bus, the relay 102 to perform time-based switch-off, so that the inverter can implement reliable and timely switch-off when the direct current side bus has a short-circuit fault, thereby avoiding damage to the inverter and other components in the grid-connected photovoltaic system.

Figure 3:
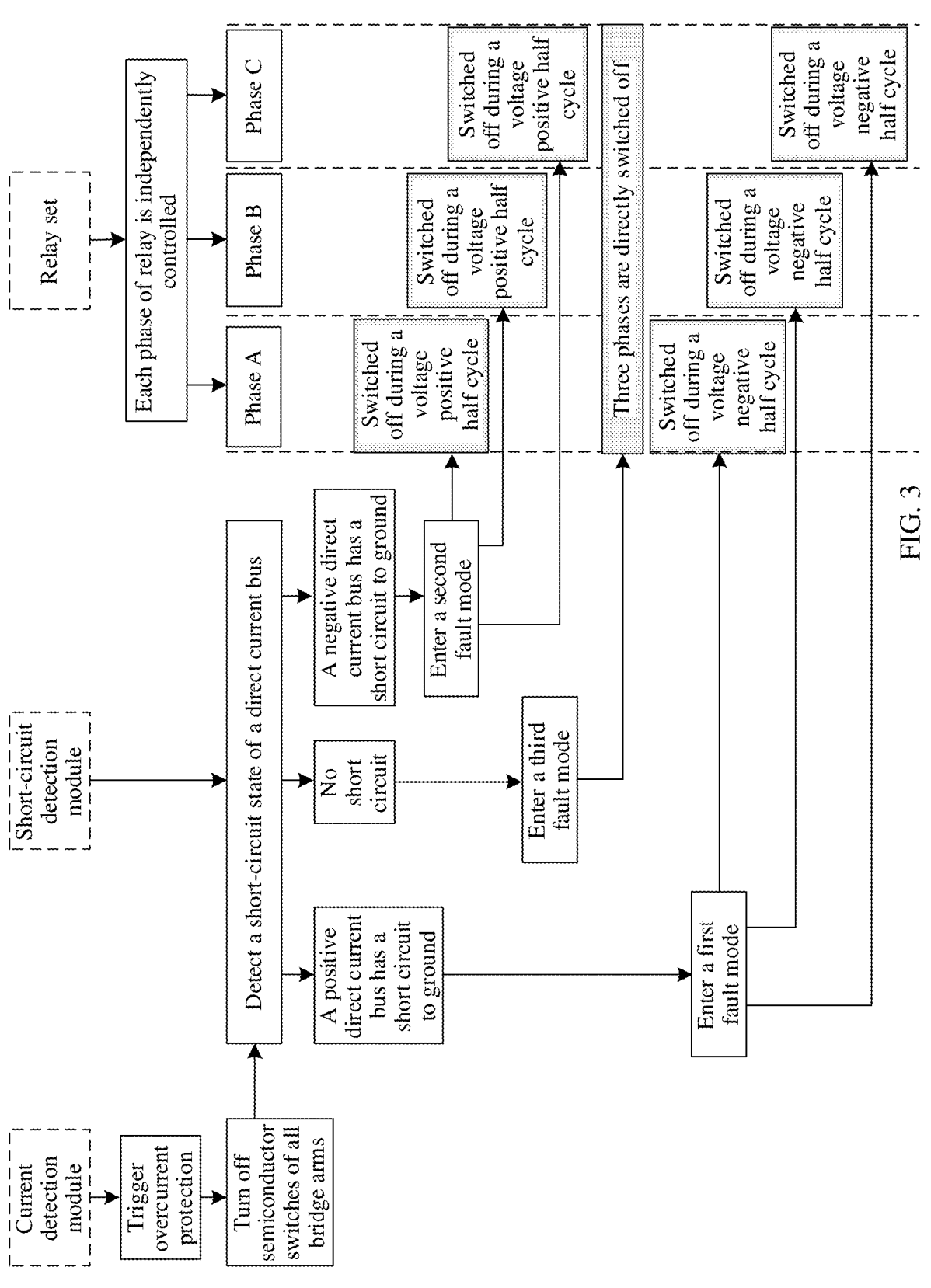
FIG. 3 is a control logic diagram of a short circuit to ground on a direct current side of an inverter according to the embodiments.

FIG. 3 is a flowchart of a method for ensuring reliable switch-off of an inverter when a direct current bus of the inverter has a short circuit to ground according to an embodiment. As shown in FIG. 3, when a current flowing through at least one semiconductor switch in the power conversion circuit is greater than a set threshold, the current detection circuit reports a corresponding current detection signal to the controller 103 to trigger overcurrent protection of the inverter, and the controller 103 switches off semiconductor switches of all bridge arms in the power conversion circuit 101. Further, the controller 103 uses different switch-off logic of the relay 102 based on status information of a short circuit to ground of the direct current bus reported by a short-circuit monitoring module.

For example, when the positive direct current bus has a short circuit to ground, the controller 103 switches off the phase-X relay in the relay 102 when a phase-X grid voltage is in a negative half cycle. When the direct current bus has no short circuit to ground, the controller 103 immediately switches off all relays in the relay 102. When the negative direct current bus has a short circuit to ground, the controller 103 switches off the phase-X relay in the relay 102 when the phase-X grid voltage is in a positive half cycle.

Figure 4A:
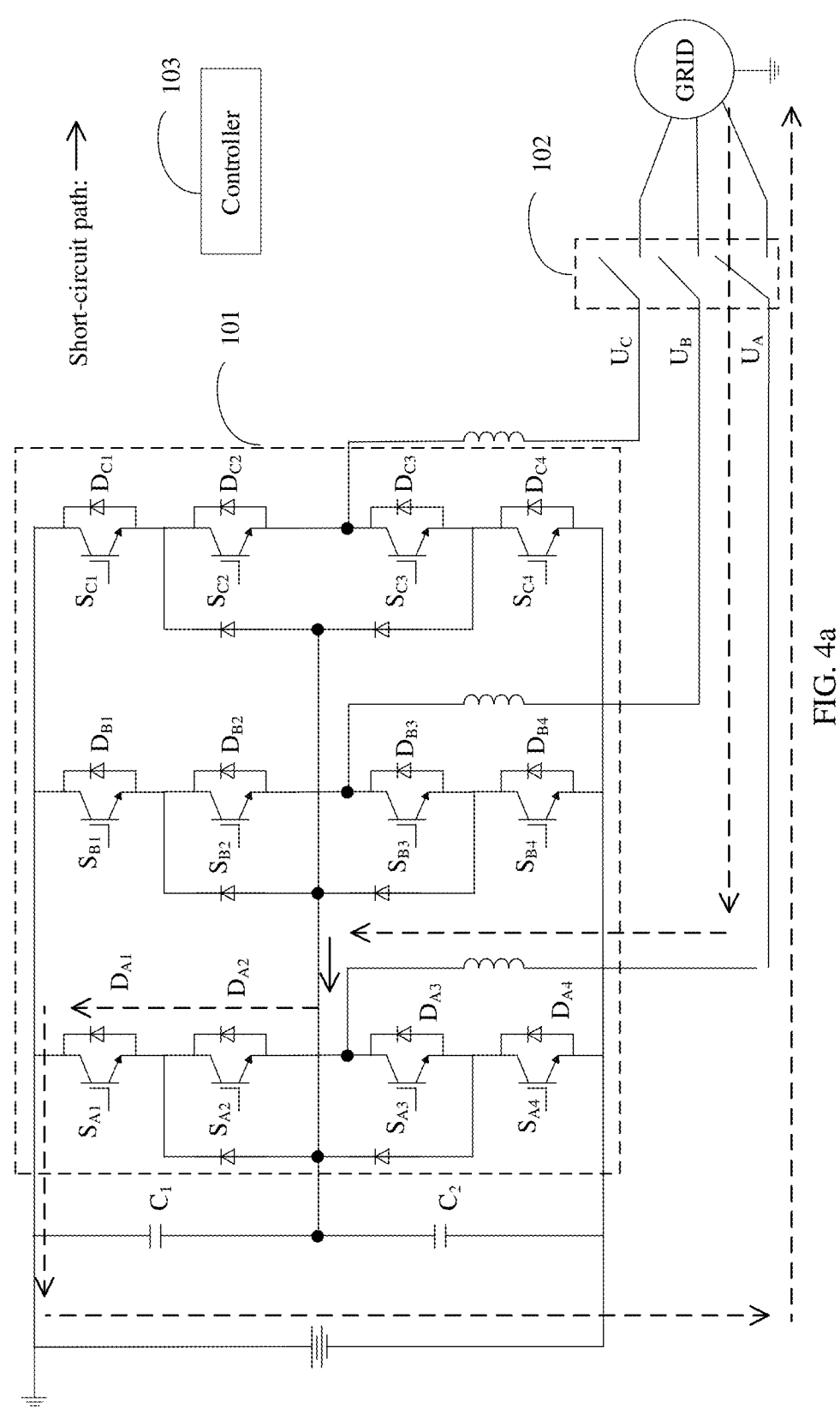
FIG. 4a is a diagram of a flow direction of a short-circuit current when a positive direct current bus has a short circuit to ground according to the embodiments.

The following uses a three-level inverter as an example to describe in detail the method provided in the embodiments. FIG. 4a is a topological diagram of a three-level grid-connected inverter system. The system can include components such as a direct current source, an inverter, and a transformer (a grid or a load). The inverter includes bleeder capacitors $C_1$ and $C_2$ on a direct current side, a power conversion circuit 101, and a relay 102 connected to an alternating current output terminal of the power conversion circuit 101. For example, each phase of bridge arm of the power conversion circuit 101 includes four semiconductor switches connected in series in sequence, such as $S_{x1}$ to $S_{x4}$, and freewheeling diodes connected to each semiconductor switch in an anti-parallel manner, such as $D_{x1}$ to $D_{x4}$. $S_{x1}$ and $S_{x3}$ are connected in a complementary manner, and $S_{x2}$ and $S_{x4}$ are connected in a complementary manner. When $S_{x1}$ and $S_{x2}$ are connected, a phase X outputs a positive level. When $S_{x2}$ and $S_{x3}$ are connected, the phase X outputs a zero level. When $S_{x3}$ and $S_{x4}$ are connected, the phase X outputs a negative level. Therefore, there are three possible values of a voltage output by each phase of an alternating current side of the inverter relative to a voltage of the direct current side, which is also an origin of the name of the three-level inverter.

It should be noted that, in FIG. 4a, neither the positive direct current bus nor the negative direct current bus is provided with the anti-reverse diode shown in FIG. 1, and a neutral wire of the transformer is grounded. When a positive direct current bus has a short circuit to ground, a short-circuit current loop is formed between the transformer, the earth, and the positive direct current bus, resulting in a rapid increase of a current flowing through the semiconductor switch. As described above, the current detection circuit is configured to detect a magnitude of a current flowing through a semiconductor switch. Therefore, when a current flowing through at least one semiconductor switch in the power conversion circuit is greater than a set threshold, the current detection circuit reports a current detection signal to the controller 103, and the controller 103 switches off semiconductor switches of all bridge arms in the power conversion circuit 101, such as $S_{x1}$ to $S_{x4}$, to cut off a short-circuit current loop as much as possible and prevent the short-circuit current from damaging the semiconductor switch.

However, for example, when a phase-A voltage of the grid is in a positive half cycle, even if all semiconductor switches, such as $S_{A1}$ to $S_{A4}$, of a phase-A bridge arm in the power conversion circuit 101 are switched off, the short-circuit current still forms a loop along diodes $D_{A1}$ and $D_{A2}$ that are connected to the semiconductor switches $S_{A1}$ and $S_{A2}$ in an anti-parallel manner, as shown in FIG. 4a. In addition, because the diodes $D_{A1}$ and $D_{A2}$ are uncontrollable components, it is difficult to cut off a short-circuit current path between $D_{A1}$ and $D_{A2}$ by using the controller 103. At the same time, when the short-circuit current flows through $D_{A1}$ and $D_{A2}$ to form a loop, due to a relatively large short-circuit current, a phase-A relay is prone to sticking when the controller 103 switches off the phase-A relay. As a result, it is difficult to switch off the phase-A relay, and the short-circuit current loop still cannot be reliably cut off.

For case of description, embodiments are described by only using a phase-A short-circuit current as an example. It may be appreciated that, in a scenario in which the positive direct current bus has a short circuit to ground, if a phase-B voltage or a phase-C voltage of the grid is in the positive half cycle, existence of diodes $D_{B1}$ and $D_{B2}$ or diodes $D_{C1}$ and $D_{C2}$ also causes a short-circuit current loop to be formed between the earth, the positive direct current bus, and the transformer. As a result, a phase-B relay and a phase-C relay are stuck when being switched off, and safety of a component like the inverter is severely affected.

Figure 4B:
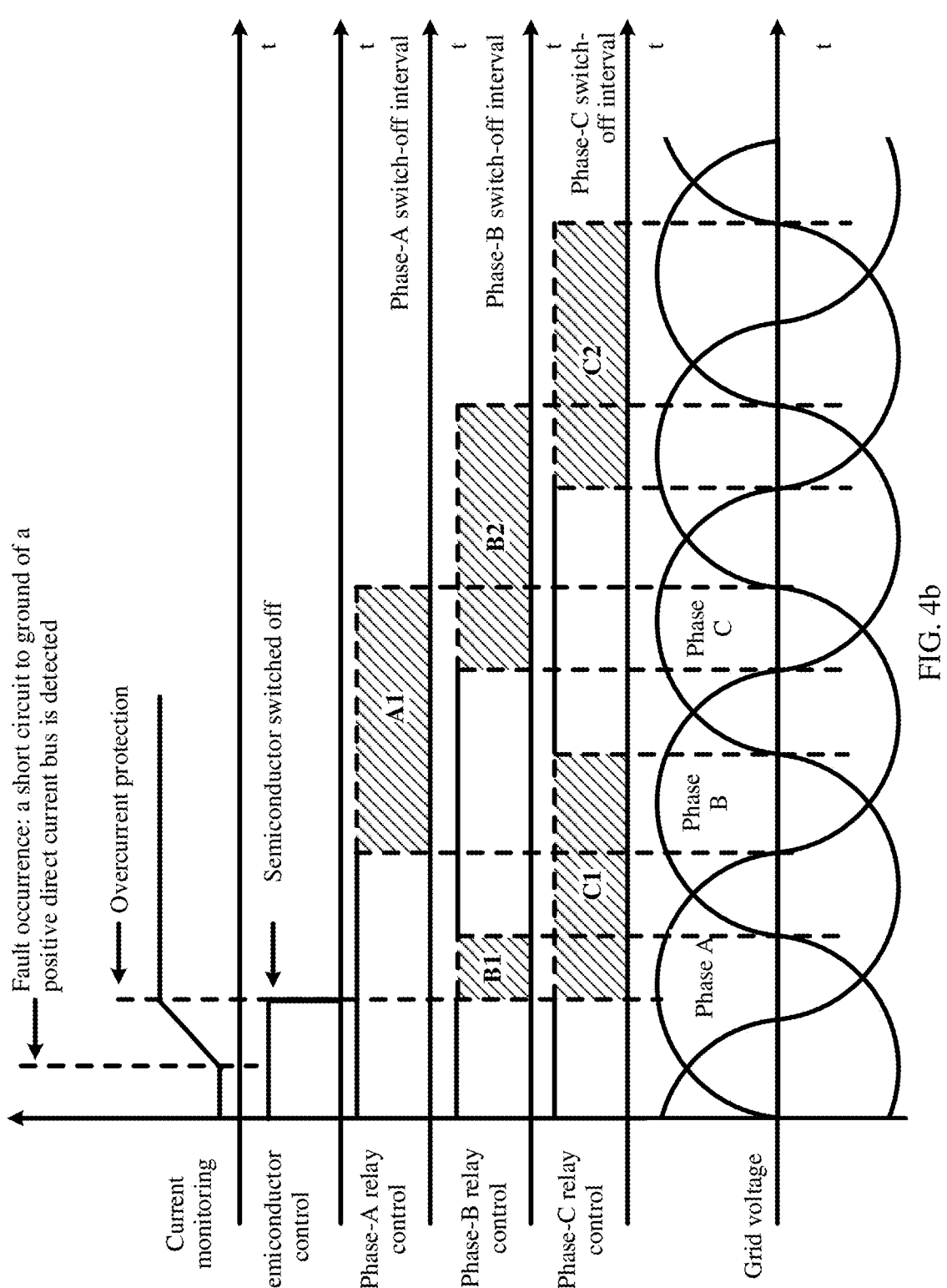
FIG. 4b is a switch-off timing diagram of a relay when a positive direct current bus has a short circuit to ground according to the embodiments.

To effectively switch off the relay 102 and reliably cut off the short-circuit current loop, the embodiments provide a time-based switch-off method for the relay 102. FIG. 4b is a switch-off timing diagram of a relay 102 when a positive direct current bus has a short circuit to ground. As shown in FIG. 4b, when a current flowing through at least one semiconductor switch in the power conversion circuit is greater than a set threshold, the current detection circuit reports a current detection signal to the controller 103, to trigger overcurrent protection of the inverter. The controller 103 switches off semiconductor switches of all bridge arms in the power conversion circuit 101. At the same time, the controller 103 determines, based on a short-circuit state signal reported by the short-circuit detection circuit, that the positive direct current bus has a short circuit to ground, the inverter enters a first fault mode, and the controller 103 switches off the phase-X relay only when a phase-X grid voltage is negative.

For example, as shown in FIG. 4b, at a moment when all semiconductor switches in the power conversion circuit 101 are switched off, the phase-A voltage of the grid is in the positive half cycle, and voltages of the phase-B and the phase-C are in a negative half cycle. Therefore, to ensure reliable switch-off of the relay 102, only the phase-B relay and the phase-C relay may be switched off in this case. In addition, in this cycle, a time interval in which the phase-B relay can be switched off is only a time interval corresponding to a negative voltage of a phase-B grid, such as B1. Similarly, a time interval in which the phase-C relay can be switched off is only C1.

It should be noted that, at a moment when all semiconductor switches in the power conversion circuit 101 are switched off, in addition to determining, based on whether the phase-A, the phase-B voltage, and the phase-C voltage of the grid are in the positive half cycle or the negative half cycle, which relay in the relay 102 can be switched off, the controller 103 further needs to determine whether a time interval in which the relay can be switched off is greater than minimum duration for switching off the relay. If the time interval in which the relay can be switched off is greater than the minimum duration for switching off the relay, the controller 103 immediately switches off a corresponding relay. If the time interval in which the relay can be switched off is less than the minimum duration for switching off the relay, the controller 103 does not switch off a corresponding relay temporarily, but switches off a corresponding relay in a next time interval in which the relay can be switched off.

For example, as shown in FIG. 4b, at a moment when all semiconductor switches in the power conversion circuit 101 are switched off, only grid voltages of the phase B and the phase C are in the negative half cycle, and the controller 103 determines that the phase-B relay and the phase-C relay can be switched off. In addition, a time interval in which the phase-B relay can be switched off is B1, and a time interval in which the phase-C relay can be switched off is C1. In this case, if the time interval B1 is greater than minimum duration for switching off the phase-B relay, the controller 103 immediately switches off the phase-B relay. Similarly, if the time interval C1 is greater than minimum duration for switching off the phase-C relay, the controller 103 immediately switches off the phase-C relay. On the contrary, if the time interval B1 is less than the minimum duration for switching off the phase-B relay, the controller 103 does not switch off the phase-B relay temporarily, but waits until the phase-B grid voltage enters a next time period in which the phase-B relay can be switched off, such as a time interval B2, and then switches off the phase-B relay. Similarly, if the time interval C1 is less than the minimum duration for switching off the phase-C relay, the controller 103 does not switch off the phase-C relay temporarily, but waits until the phase-C grid voltage enters a next time period in which the phase-C relay can be switched off, such as a time interval C2, and then switches off the phase-C relay.

Based on a same principle, as shown in FIG. 4b, at a moment when all semiconductor switches in the power conversion circuit 101 are switched off, the grid voltage of the phase A is in the positive half cycle. Therefore, the controller 103 does not switch off the phase-A relay temporarily, but waits until the phase-A grid voltage is in the negative half cycle, such as A1, and then switches off the phase-A relay.

Thus, an implementation principle of the foregoing solution is that, when the positive direct current bus has a short circuit to ground, the semiconductor switches $S_{A1}$ and $S_{A2}$ in the power conversion circuit 101 are switched on, and the semiconductor switches $S_{A3}$ and $S_{A4}$ are switched off, the short-circuit current may not only flow through the semiconductor switches $S_{A1}$ and $S_{A2}$, but also may flow through the diodes $D_{A1}$ and $D_{A2}$ that are connected to the semiconductor switches $S_{A1}$ and $S_{A2}$ in an anti-parallel manner. Therefore, after the current detection circuit detects an overcurrent signal, even if the controller 103 switches off the semiconductor switches $S_{A1}$ and $S_{A2}$ in a timely manner, because the diodes $D_{A1}$ and $D_{A2}$ are uncontrollable, when the phase-A grid voltage is in the positive half cycle, the short-circuit current loop shown in FIG. 4a is still formed. At the same time, because the short-circuit current is relatively large at this time, if the controller 103 directly switches off the phase-A relay, the phase-A relay is likely to be stuck. As a result, the phase-A relay cannot be reliably switched off, and the short-circuit current still increases uncontrollably. On the contrary, if the controller 103 switches off the phase-A relay when the phase-A grid voltage is in the negative half cycle, anode potentials of the diodes $D_{A1}$ and $D_{A2}$ are less than cathode potentials, and the diodes $D_{A1}$ and $D_{A2}$ are not switched on. Therefore, in this case, the short-circuit current loop cannot be formed between the grid, the earth, and the positive direct current bus, thereby avoiding sticking when the phase-A relay is switched off, and ensuring reliable switch-off. It should be noted that, for case of description, the foregoing principle merely uses the phase-A bridge arm in the power conversion circuit 101 and the phase-A relay as an example. Actually, the foregoing principle is also applicable to the phase-B bridge arm and the phase-C bridge arm in the power conversion circuit 101 and the phase-B relay and the phase-C relay in the relay 102. Details are not described herein again.

It should be noted that, as shown in FIG. 4b, at a moment when the inverter triggers overcurrent protection, the phase-A grid voltage is in the positive half cycle, the semiconductor switches $S_{A1}$ and $S_{A2}$ on the phase-A bridge arm are switched on, and the semiconductor switches $S_{A3}$ and $S_{A4}$ are switched off. Therefore, the short-circuit current may not only flow through the semiconductor switches $S_{A1}$ and $S_{A2}$, but also may flow through the diodes $D_{A1}$ and $D_{A2}$ that are connected to the semiconductor switches $S_{A1}$ and $S_{A2}$ in an anti-parallel manner. On the contrary, in this case, the phase-B grid voltage is in the negative half cycle, semiconductor switches $S_{B3}$ and $S_{B4}$ on the phase-B bridge arm are switched on, and semiconductor switches $S_{B1}$ and $S_{B2}$ are switched off. Therefore, the short-circuit current cannot flow through the phase-B bridge arm. Similarly, the phase-C grid voltage is also in the negative half cycle, semiconductor switches $S_{C3}$ and $S_{C4}$ on the phase-C bridge arm are switched on, and semiconductor switches $S_{C1}$ and $S_{C2}$ are switched off. Therefore, the short-circuit current cannot flow through the phase-C bridge arm. Therefore, at the moment when the inverter triggers overcurrent protection, the controller 103 switches off only the semiconductor switches $S_{A1}$ and $S_{A2}$ on the phase-A bridge arm, to prevent the short-circuit current from damaging all the semiconductor switches in the power conversion circuit 101. Therefore, in a case of a short circuit to ground of the positive direct current bus, at the moment when the inverter triggers overcurrent protection, the controller 103 may not switch off all the semiconductor switches in the power conversion circuit 101, but switch off only an upper half bridge arm of the phase-X bridge arm, such as the semiconductor switches $S_{X1}$ and $S_{X2}$, to ensure that all the semiconductor switches of the power conversion circuit 101 are not damaged by the short-circuit current.

In addition, with improvement of a current withstand capability of the semiconductor switch, at the moment when the inverter triggers overcurrent protection, the controller 103 may not switch off any semiconductor switch, but switch off the phase-X relay only when the phase-X grid voltage is in the negative half cycle. For example, as shown in FIG. 4b, at the moment when the inverter triggers overcurrent protection, the phase-A grid voltage is in the positive half cycle, and the short-circuit current may flow through the semiconductor switches $S_{A1}$ and $S_{A2}$ on the phase-A bridge arm and the diodes $D_{A1}$ and $D_{A2}$ that are connected to the semiconductor switches $S_{A1}$ and $S_{A2}$ in an anti-parallel manner. When withstand currents of the semiconductor switches $S_{A1}$ and $S_{A2}$ are large enough, the semiconductor switches $S_{A1}$ and $S_{A2}$ are not damaged even if they are not switched off by the controller 103. When the phase-A grid voltage is in the negative half cycle, the phase-A bridge arm has no short-circuit current. Therefore, the phase-A relay connected to the phase-A bridge arm can be reliably switched off without relay sticking.

Figure 5A:
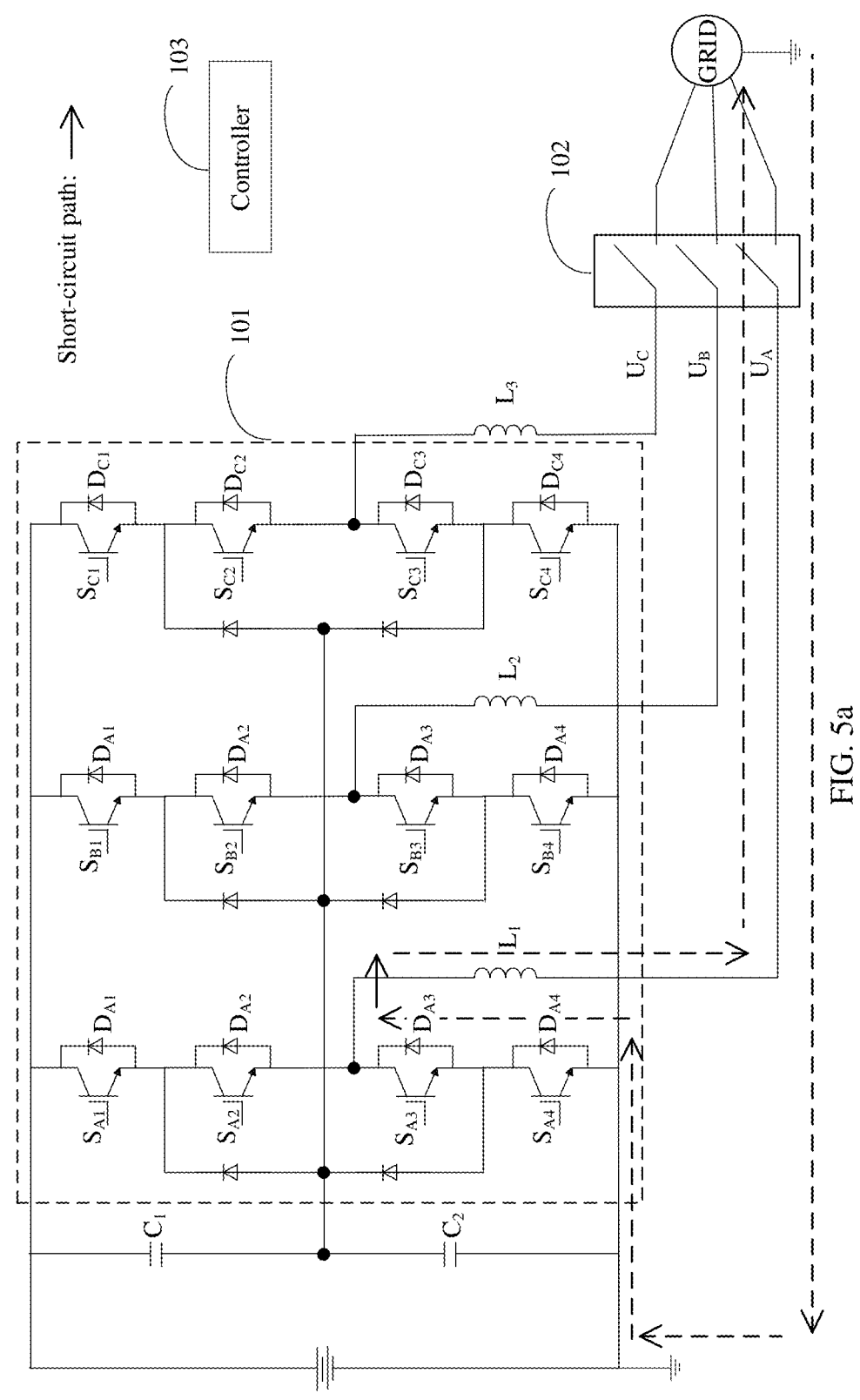
FIG. 5a is a diagram of a flow direction of a short-circuit current when a negative direct current bus has a short circuit to ground according to the embodiments.

FIG. 5a is also a topological diagram of a three-level grid-connected inverter system. A main difference between FIG. 5a and FIG. 4a lies in that a scenario corresponding to FIG. 5a is that a negative direct current bus has a short circuit to ground. When the negative direct current bus has a short circuit to ground, a short-circuit current loop is formed between the transformer, the earth, and the negative direct current bus, resulting in a rapid increase of a current flowing through the semiconductor switch. As described above, the current detection circuit is configured to detect a magnitude of a current flowing through a semiconductor switch. When a current flowing through at least one semiconductor switch in the power conversion circuit is greater than a set threshold, the current detection circuit reports an overcurrent signal to the controller 103, and the controller 103 switches off semiconductor switches of all bridge arms in the power conversion circuit 101, to cut off a short-circuit current loop as much as possible. However, it should be noted that, when the phase-A grid voltage is in the negative half cycle, even if all semiconductor switches of the phase-A bridge arm, such as $S_{A1}$ to $S_{A4}$, are switched off, the short-circuit current still forms a loop along the diodes $D_{A3}$ and $D_{A4}$ that are connected to the semiconductor switches $S_{A3}$ and $S_{A4}$ in an anti-parallel manner, as shown in FIG. 5a. In addition, because the diodes $D_{A3}$ and $D_{A4}$ are uncontrollable components, it is difficult to cut off a short-circuit current path between $D_{A3}$ and $D_{A4}$ by using the controller 103. At the same time, when the short-circuit current flows through $D_{A3}$ and $D_{A4}$ to form a current loop, due to a relatively large short-circuit current, the phase-A relay is prone to sticking when the controller 103 switches off the phase-A relay. As a result, it is difficult to switch off the phase-A relay, and the short-circuit current loop still cannot be reliably cut off. For case of description, embodiments are described by only using a phase-A short-circuit current as an example. Actually, in a scenario in which the negative direct current bus has a short circuit to ground, if the phase-B voltage or the phase-C voltage of the grid is in the negative half cycle, existence of the diodes $D_{B3}$ and $D_{B4}$ or diodes $D_{C3}$ and $D_{C4}$ also causes a short-circuit current loop to be formed between the earth, the negative direct current bus, and the transformer. As a result, the phase-B relay and the phase-C relay in the relay 102 are stuck when being switched off, and safety of a component like the inverter is severely affected.

Figure 5B:
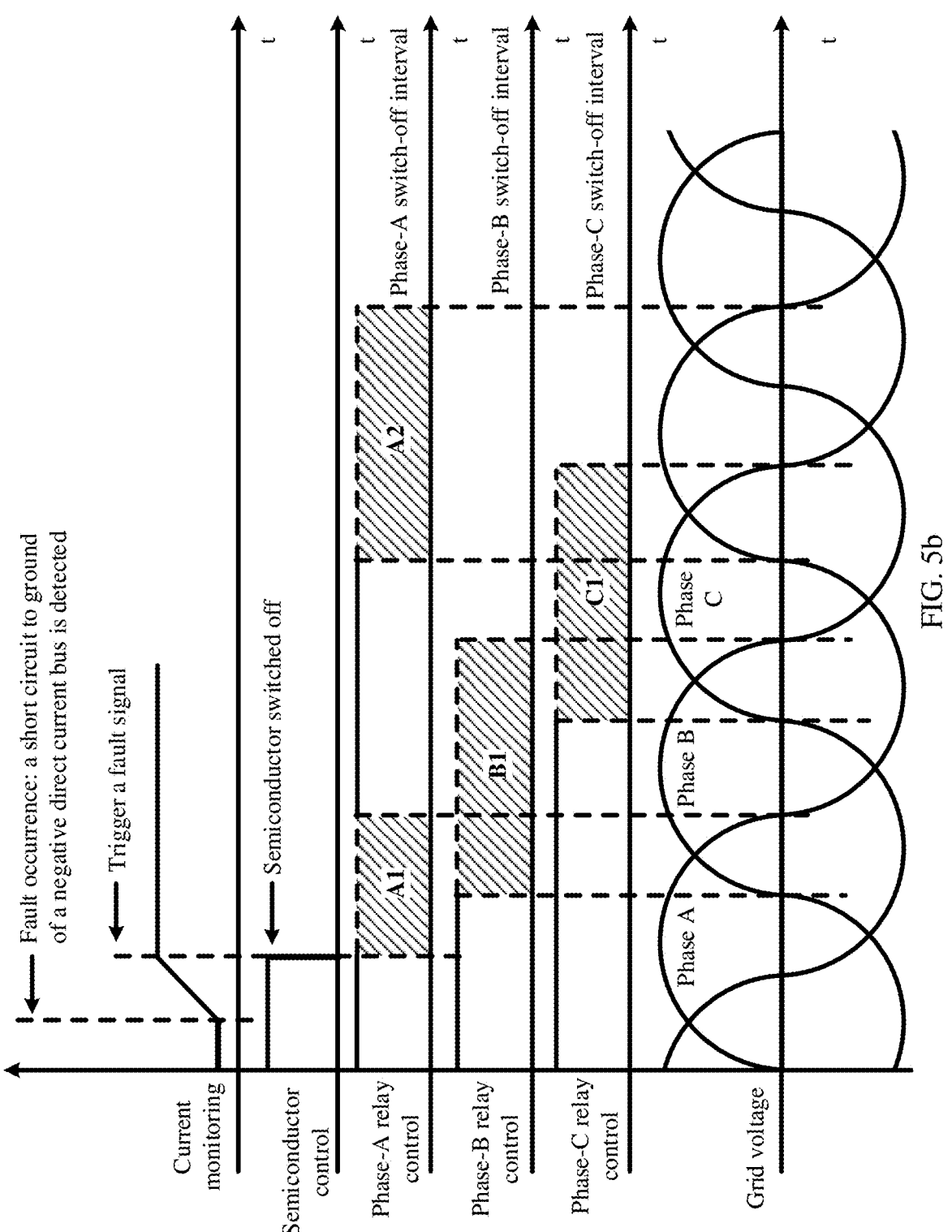
FIG. 5b is a switch-off timing diagram of a relay when a negative direct current bus has a short circuit to ground according to the embodiments.

To effectively switch off the relay 102 and reliably cut off the short-circuit current loop, the embodiments provide a time-based switch-off method for the relay 102. FIG. 5b is a switch-off timing diagram of a relay 102 when a negative direct current bus has a short circuit to ground. As shown in FIG. 5b, when a current flowing through a semiconductor switch is greater than a set threshold, the current detection circuit reports an overcurrent signal to the controller 103, to trigger overcurrent protection of the inverter. The controller 103 switches off semiconductor switches of all bridge arms in the power conversion circuit 101. At the same time, the controller 103 determines, based on a short-circuit state signal reported by the short-circuit detection circuit, that the negative direct current bus has a short circuit to ground, the inverter enters a protection mode of a short circuit to ground of the negative direct current bus, and the controller 103 can switch off the phase-X relay only when the phase-X grid voltage is positive.

For example, as shown in FIG. 5b, at a moment when the semiconductor switch is switched off, the phase-A voltage of the grid is in the positive half cycle, and voltages of the phase B and the phase C are in the negative half cycle. Therefore, to ensure reliable switch-off of the relay 102, only the phase-A relay may be switched off at this time. In addition, in this cycle, a time interval in which the phase A relay can be switched off is only a time interval corresponding to a time when the phase-A grid voltage is positive, such as A1.

It should be noted that, at a moment when all semiconductor switches in the power conversion circuit 101 are switched off, in addition to determining, based on whether the phase-A, the phase-B voltage, and the phase-C voltage of the grid are in the positive half cycle or the negative half cycle, which relay in the relay 102 can be switched off, the controller 103 further needs to determine whether a time interval in which the relay can be switched off is greater than minimum duration for switching off the relay. If the time interval in which the relay can be switched off is greater than the minimum duration for switching off the relay, the controller 103 immediately switches off a corresponding relay. If the time interval in which the relay can be switched off is less than the minimum duration for switching off the relay, the controller 103 does not switch off a corresponding relay temporarily, but switches off a corresponding relay in a next time interval in which the relay can be switched off.

For example, as shown in FIG. 5b, at a moment when all semiconductor switches in the power conversion circuit 101 are switched off, only a grid voltage of the phase A is in the positive half cycle, and the controller 103 determines that the phase-A relay can be switched off. In addition, a time interval in which the phase-A relay can be switched off is A1. In this case, if the time interval A1 is greater than minimum duration for switching off the phase-A relay, the controller 103 immediately switches off the phase-A relay. On the contrary, if the time interval A1 is less than the minimum duration for switching off the phase-A relay, the controller 103 does not switch off the phase-A relay temporarily, but switches off the phase-A relay when the phase-A grid voltage enters a next time period in which the phase-A relay can be switched off, such as a time interval A2.

Based on a same principle, as shown in FIG. 5b, at a moment when all semiconductor switches in the power conversion circuit 101 are switched off, the phase-B grid voltage is in the negative half cycle. Therefore, the controller 103 does not switch off the phase-B relay temporarily, but waits until the phase-B grid voltage is in the positive half cycle, such as B1, and then switches off the phase-B relay. Similarly, as shown in FIG. 5b, at a moment when all semiconductor switches in the power conversion circuit 101 are switched off, the phase-C grid voltage is also in the negative half cycle. Therefore, the controller 103 does not switch off the phase-C relay temporarily, but waits until the phase-C grid voltage is in the positive half cycle, such as C1, and then switches off the phase-C relay.

Therefore, an implementation principle of the foregoing solution is that, when the negative direct current bus has a short circuit to ground and the phase-A grid voltage is in the negative half cycle, the semiconductor switches $S_{A3}$ and $S_{A4}$ on the phase-A bridge arm are switched on, the semiconductor switches $S_{A1}$ and $S_{A2}$ are switched off, and the short-circuit current may not only flow through the semiconductor switches $S_{A3}$ and $S_{A4}$, but also may flow through the diodes $D_{A3}$ and $D_{A4}$ that are connected to the semiconductor switches $S_{A3}$ and $S_{A4}$ in an anti-parallel manner. Therefore, after the current detection circuit detects an overcurrent signal, even if the controller 103 switches off the semiconductor switches $S_{A3}$ and $S_{A4}$ in a timely manner, because the diodes $D_{A3}$ and $D_{A4}$ are uncontrollable, when the phase-A grid voltage is in the negative half cycle, the short-circuit current loop shown in FIG. 5a is still formed. At the same time, because the short-circuit current is relatively large at this time, if the controller 103 directly switches off the phase-A relay, the phase-A relay is likely to be stuck. As a result, the phase-A relay cannot be reliably switched off, and the short-circuit current still increases uncontrollably. On the contrary, if the controller 103 switches off the phase-A relay when the phase-A grid voltage is in the positive half cycle, the cathode potentials of the diodes $D_{A3}$ and $D_{A4}$ are greater than the anode potentials, and the diodes $D_{A3}$ and $D_{A4}$ are not switched on. Therefore, in this case, the short-circuit current loop cannot be formed between the grid, the earth, and the negative direct current bus, thereby avoiding sticking when the phase-A relay is switched off, and ensuring reliable switch-off. It should be noted that, in this case, the current may flow to the positive direct current bus along the diodes $D_{A1}$ and $D_{A2}$. However, because the positive direct current bus has no short circuit to ground, the current passing through the diodes $D_{A1}$ and $D_{A2}$ does not cause damage to the inverter. It should be noted that, for ease of description, the foregoing principle merely uses the phase-A bridge arm in the power conversion circuit 101 and the phase-A relay as an example. Actually, the foregoing principle is also applicable to the phase-B bridge arm and the phase-C bridge arm in the power conversion circuit 101, the phase-B relay, and the phase-C relay. Details are not described herein again.

It should be noted that, as shown in FIG. 5b, at a moment when the inverter triggers overcurrent protection, both the phase-B grid voltage and the phase-C grid voltage are in the negative half cycle. Therefore, in this case, in the power conversion circuit 101, the semiconductor switches $S_{B3}$ and $S_{B4}$ on the phase-B bridge arm are switched on, the semiconductor switches $S_{B1}$ and $S_{B2}$ are switched off, the semiconductor switches $S_{C3}$ and $S_{C4}$ on the phase-C bridge arm are switched on, and the semiconductor switches $S_{C1}$ and $S_{C2}$ are switched off. The short-circuit current may not only flow through the semiconductor switches $S_{B3}$ and $S_{B4}$ and diodes $D_{B3}$ and $D_{B4}$, but also may flow through the semiconductor switches $S_{C3}$ and $S_{C4}$ and diodes $D_{C3}$ and $D_{C4}$. On the contrary, in this case, the phase-A grid voltage is in the positive half cycle, the semiconductor switches $S_{A1}$ and $S_{A2}$ on the phase-A bridge arm are switched on, and the semiconductor switches $S_{A3}$ and $S_{A4}$ are switched off. Therefore, the short-circuit current cannot flow through the phase-A bridge arm. Therefore, at the moment when the inverter triggers overcurrent protection, the controller 103 switches off only the semiconductor switches $S_{B3}$ and $S_{B4}$ on the phase-B bridge arm and the semiconductor switches $S_{C3}$ and $S_{C4}$ on the phase-C bridge arm, to prevent the short-circuit current from damaging all the semiconductor switches in the power conversion circuit 101. Therefore, in a case of a short circuit to ground of the negative direct current bus, at the moment when the inverter triggers overcurrent protection, the controller 103 may not switch off all the semiconductor switches in the power conversion circuit 101, but switch off only a lower half bridge arm of the phase-X bridge arm, such as the semiconductor switches $S_{x3}$ and $S_{x4}$, to ensure that all the semiconductor switches of the power conversion circuit 101 are not damaged by the short-circuit current.

In addition, with improvement of a current withstand capability of the semiconductor switch, at the moment when the inverter triggers overcurrent protection, the controller 103 may not switch off any semiconductor switch, but switch off the phase-X relay only when the phase-X grid voltage is in the positive half cycle. For example, as shown in FIG. 5b, at the moment when the inverter triggers overcurrent protection, both the phase-B grid voltage and the phase-C grid voltage are in the negative half cycle, and the short-circuit current may not only flow through the semiconductor switches $S_{B3}$ and $S_{B4}$ and the diodes $D_{B3}$ and $D_{B4}$, but also may flow through the semiconductor switches $S_{C3}$ and $S_{C4}$ and the diodes $D_{C3}$ and $D_{C4}$. When withstanding currents of the semiconductor switches $S_{B3}$, $S_{B4}$, $S_{C3}$, and $S_{C4}$ are large enough, the semiconductor switches $S_{B3}$, $S_{B4}$, $S_{C3}$, and $S_{C4}$ are not damaged even if they are not switched off by the controller 103. When the phase-B grid voltage and the phase-C grid voltage are in the positive half cycle, the phase-B bridge arm and the phase-C bridge arm have no short-circuit current. Therefore, the phase-B relay and the phase-C relay can be reliably switched off without relay sticking.

In the foregoing two cases in which the positive direct current bus has a short circuit to ground and in which the negative direct current bus has short circuit to ground, to ensure reliable switch-off of the relay 102, the controller 103 performs a time-based switch-off control policy on the phase-X relay in the relay 102 based on a type of a short-circuit fault. In actual operation of the inverter, in addition to the foregoing two cases in which the direct current bus has a short circuit to ground, there is still another incentive that causes an abnormal current flowing through the semiconductor switch, and the relay 102 needs to be switched off in a timely manner to protect a related device like the inverter.

Figure 6:
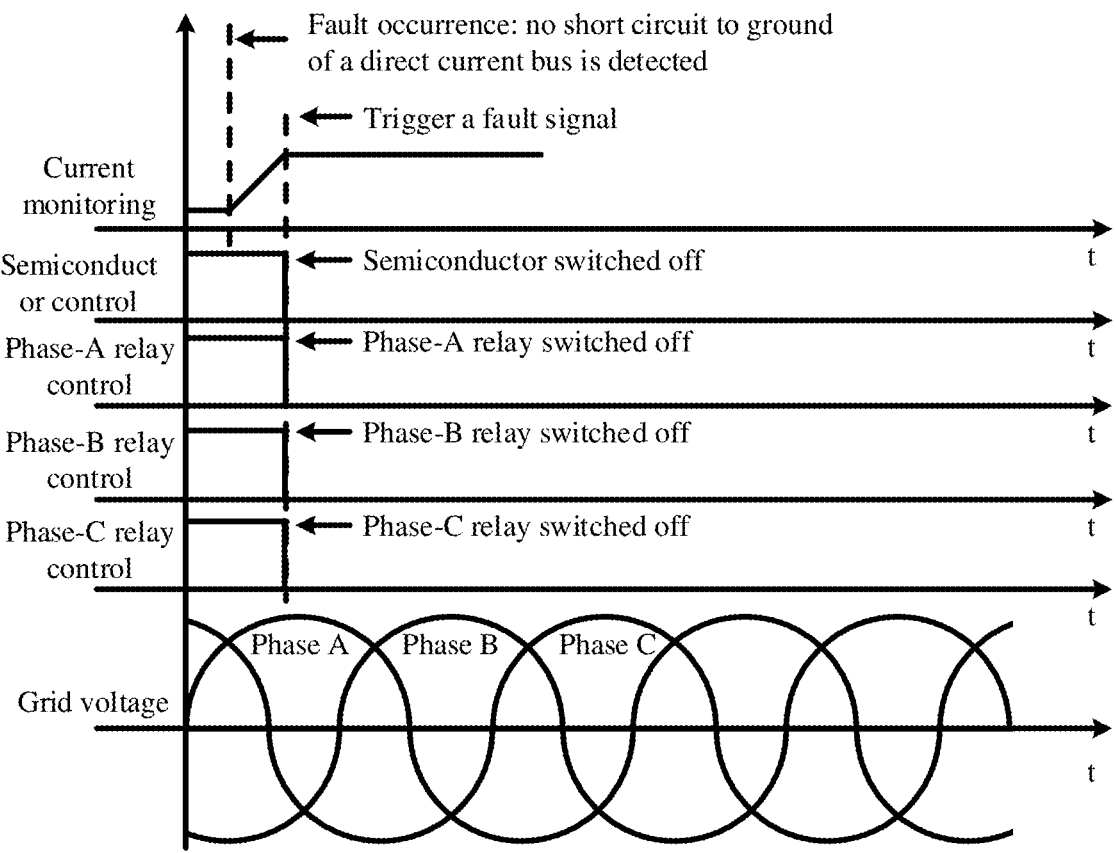
FIG. 6 is a switch-off timing diagram of a relay when a direct current bus has no short circuit to ground according to the embodiments.

Therefore, FIG. 6 is a switch-off timing diagram of a relay 102 when a direct current bus has no short circuit to ground. As shown in FIG. 6, when a current flowing through at least one semiconductor switch in the power conversion circuit is greater than a set threshold, the current detection circuit reports an overcurrent signal to the controller 103, the inverter triggers overcurrent protection, and the controller 103 switches off semiconductor switches of all bridge arms in the power conversion circuit 101. Similarly, the controller 103 determines, based on a short-circuit state signal reported by the short-circuit detection circuit, that the direct current bus has no short circuit to ground, the inverter uses normal protection logic, and the controller 103 immediately switches off all relays in the relay 102.

It should be noted that, with improvement of a current withstand capability of the semiconductor switch, when the inverter has an overcurrent fault and no direct current bus has a short circuit to ground, even if the controller 103 does not switch off all the semiconductor switches in the power conversion circuit 101, the semiconductor switches are not damaged by the short-circuit current. Therefore, the controller 103 may directly switch off all relays in the relay 102 without switching off the semiconductor switches in the power conversion circuit 101.

The foregoing embodiment describes a method for ensuring that the relay 102 is reliably switched off when the direct current bus has a short circuit to ground in an inverter system in which neither the positive direct current bus nor the negative direct current bus is provided with an anti-reverse diode or another protection circuit. In an actual application scenario, either the positive direct current bus or the negative direct current bus may be provided with the anti-reverse diode or the another protection circuit.

Figure 7A:
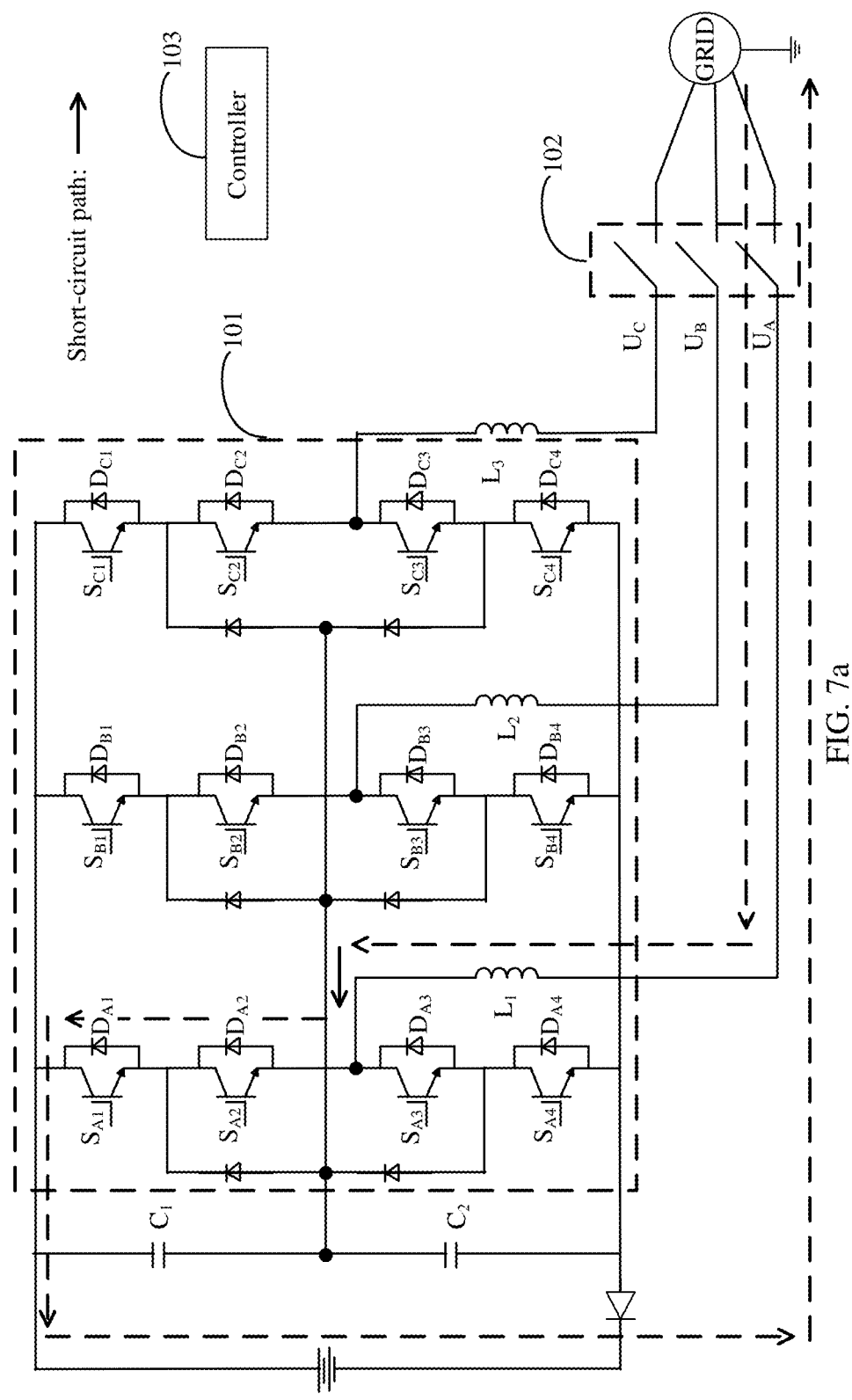
FIG. 7a is another diagram of a flow direction of a short-circuit current when a positive direct current bus has a short circuit to ground according to the embodiments.

For example, FIG. 7a is a topological diagram of a three-level grid-connected inverter system in which a negative direct current bus is provided with an anti-reverse diode. As shown in FIG. 7a, because the negative direct current bus is provided with the anti-reverse diode, when the negative direct current bus has a short circuit to ground, a short-circuit current loop cannot be formed between the grid, the earth, and the negative direct current bus, and the inverter is not damaged. On the contrary, if the positive direct current bus has a short circuit to ground, after the current detection circuit reports a current detection signal to the controller 103, the controller 103 switches off semiconductor switches of all bridge arms in the power conversion circuit 101, to cut off a short-circuit current loop as much as possible. However, even if the controller 103 switches off the semiconductor switches of all the bridge arms in the power conversion circuit 101 in a timely manner, when the phase-A voltage in the grid is in the positive half cycle, the short-circuit current still forms a loop along diodes $D_{A1}$ and $D_{A2}$ that are connected to the semiconductor switches $S_{A1}$ and $S_{A2}$ in an anti-parallel manner, as shown in FIG. 7a. It should be noted that the short-circuit current loop shown in FIG. 7a is the same as the short-circuit current loop shown in FIG. 4a. Therefore, for the three-level grid-connected inverter system in which only the negative direct current bus is provided with the anti-reverse diode, after the current detection circuit reports the current detection signal to the controller 103, the controller 103 does not need to determine which protection logic to use based on information that indicates that the direct current bus has a short circuit to ground and that is reported by the short-circuit detection circuit to the controller 103, but directly uses time-based switch-off logic of the relay 102 shown in FIG. 4b. That is, the controller 103 switches off the phase-X relay only when the phase-X grid voltage is negative.

Optionally, when the inverter enters an overcurrent protection state, the controller 103 may also receive information reported by the short-circuit detection circuit. When the controller 103 receives a signal indicating that the positive direct current bus has a short circuit to ground, the controller 103 switches off the phase-X relay when the phase-X grid voltage is negative. When the controller 103 receives a signal indicating that the negative direct current bus has a short circuit to ground, the controller 103 does not need to switch off the relay 102. When the controller 103 receives a signal indicating that the direct current bus has no short circuit to ground, the controller 103 directly switches off the relay 102.

Figure 7B:
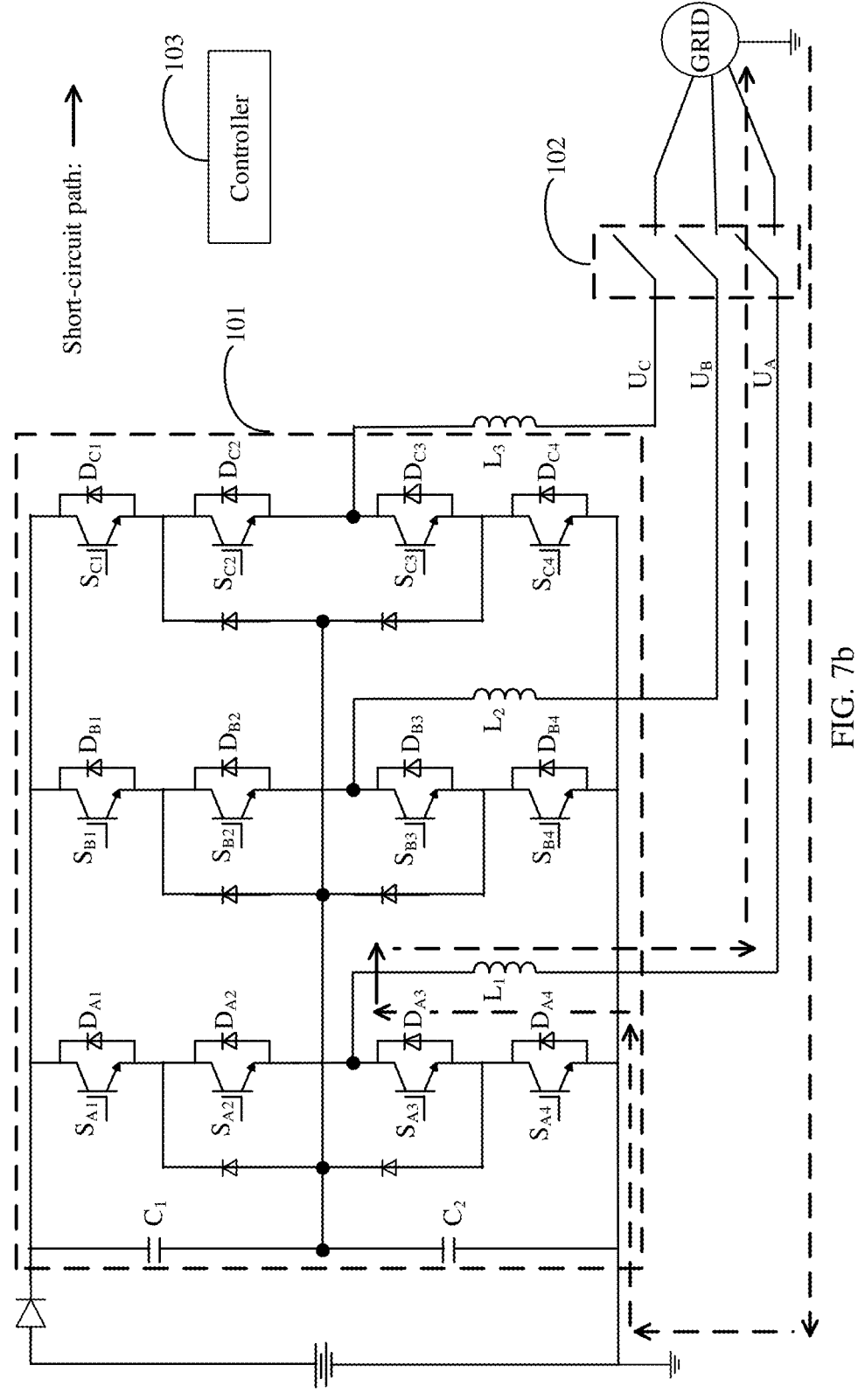
FIG. 7b is another diagram of a flow direction of a short-circuit current when a negative direct current bus has a short circuit to ground according to the embodiments.

For example, FIG. 7b is a topological diagram of a three-level grid-connected inverter system in which a positive direct current bus is provided with an anti-reverse diode. As shown in FIG. 7b, because the positive direct current bus is provided with the anti-reverse diode, when the positive direct current bus has a short circuit to ground, a short-circuit current loop cannot be formed between the grid, the earth, and the positive direct current bus, and the inverter is not damaged. On the contrary, if the negative direct current bus has a short circuit to ground, after the current detection circuit reports a current detection signal to the controller 103, the controller 103 switches off semiconductor switches of all bridge arms in the power conversion circuit 101, to cut off a short-circuit current loop as much as possible. However, even if the controller 103 switches off the semiconductor switches of all the bridge arms in the power conversion circuit 101 in a timely manner, when the phase-A voltage in the grid is in the negative half cycle, the short-circuit current still forms a loop along diodes $D_{A3}$ and $D_{A4}$ that are connected to the semiconductor switches $S_{A3}$ and $S_{A4}$ in an anti-parallel manner, as shown in FIG. 7b. It should be noted that the short-circuit current loop shown in FIG. 7b is the same as the short-circuit current loop shown in FIG. 5a. Therefore, for the three-level grid-connected inverter system in which only the positive direct current bus is provided with the anti-reverse diode, after the current detection circuit reports the current detection signal to the controller 103, the controller 103 does not need to determine which protection logic to use based on information that indicates that the direct current bus has a short circuit to ground and that is reported by the short-circuit detection circuit to the controller 103, but directly uses time-based switch-off logic of the relay 102 shown in FIG. 5b. That is, the controller 103 switches off the phase-X relay when the phase-X grid voltage is positive.

Optionally, when the inverter enters an overcurrent protection state, the controller 103 may also receive a signal reported by the short-circuit detection circuit. When the controller 103 receives a signal indicating that the positive direct current bus has a short circuit to ground, the controller 103 does not need to switch off the relay 102. When the controller 103 receives a signal indicating that the negative direct current bus has a short circuit to ground, the controller 103 switches off the phase-X relay when the phase-X grid voltage is positive. When the controller 103 receives a signal indicating that the direct current bus has a short circuit to ground, the controller 103 directly switches off the relay 102.

The foregoing embodiment describes a method for implementing reliable switch-off of the relay 102 when the direct current bus has a short circuit fault to ground in the three-level grid-connected inverter system in which the direct current bus is not provided with or is partially provided with an anti-reverse diode or another protection circuit, to protect a device like the inverter from damage.

It should be noted that, for the grid-connected inverter, because energy exchange exists between the grid-connected inverter and the grid, and a grid voltage is relatively large, when the direct current bus has a short circuit to ground, the short-circuit current is more likely to increase uncontrollably, resulting in damage to a device like the inverter. In comparison, an alternating current output terminal of an off-grid inverter is directly connected to a load, and does not exchange energy with the grid. Therefore, for an off-grid inverter system in which the direct current bus is not provided with the anti-reverse diode or the another protection circuit, a component like the inverter is less affected by the short-circuit current. However, for the off-grid inverter system, when the direct current bus has a short circuit to ground, if the short-circuit current is not cut off in a timely manner, the short-circuit current still increases, which may cause a fault to a component like the inverter. Therefore, to better ensure safety of the inverter and other components in the off-grid inverter system, a controller of the off-grid inverter may also use switch-off logic of the relay. For example, when the positive direct current bus has a short circuit to ground, the controller switches off the relay when voltages at two ends of a load are negative; when the negative direct current bus has a short circuit to ground, the controller switches off the relay when the voltages at two ends of the load are positive; and when no direct current bus has a short circuit to ground, the controller directly switches off the relay.

It should be noted that, the anti-reverse diode may be integrated inside the inverter or disposed in a power device of a previous stage of the inverter, for example, a DC/DC converter.

In addition, the semiconductor switch in the foregoing embodiment includes an insulated gate bipolar transistor (IGBT), metal-oxide-semiconductor field-effect transistor (MOSFET), a gallium nitride GaN power device, a silicon carbide SiC power device, and the like. This is not limited.

Figure 8:
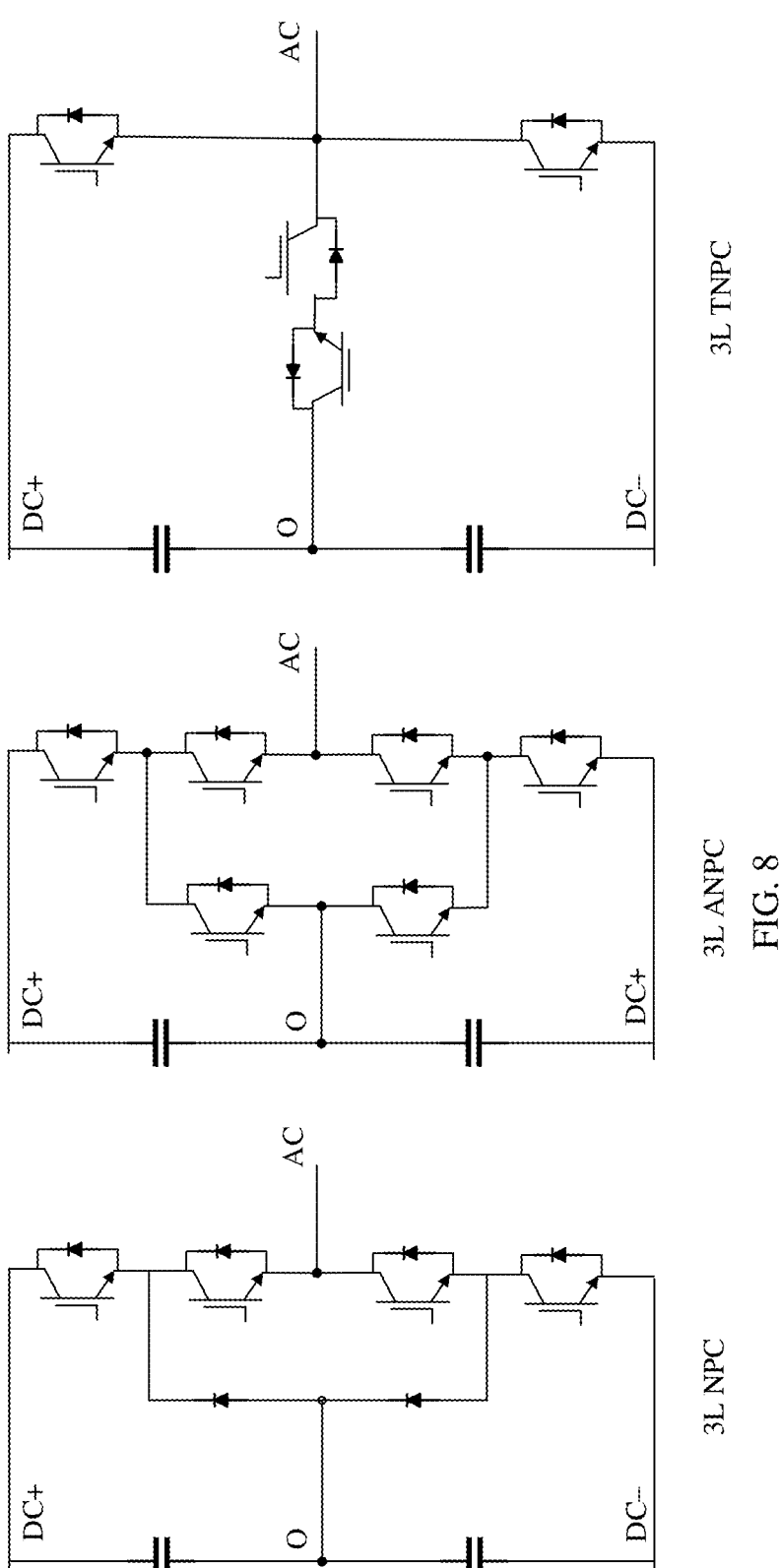
FIG. 8 is a topological diagram of several three-level neutral-point-clamped power conversion circuits.

In addition, in the foregoing embodiment, the power conversion circuit 101 is an I-type three-level topology, and the topology may be further extended to another neutral point clamped (NPC) three-level topology, for example, an active NPC (ANPC) topology or a T-type three-level topology shown in FIG. 8.

In addition, the power conversion circuit 101 in the foregoing embodiment is not limited to a three-level topology, and another two-level or multi-level topology is also applicable to this solution.

At the same time, embodiments only use the inverter as an example for description. In an actual application scenario, the inverter may be further extended to another power converter that can perform direct current/alternating current conversion, for example, a power conversion system (PCS). This is not limited.

The objectives, solutions, and beneficial effects of the embodiments are further described in detail in the foregoing specific implementations. It should be understood that the foregoing descriptions are merely specific implementations of the embodiments, but are not intended as limiting. Any modification, equivalent replacement, or improvement made based on the solutions of the embodiments shall fall within their scope.

What is claimed is:

1. A power converter, comprising:
a positive direct current bus, a negative direct current bus, a power conversion circuit, a relay, and a controller, wherein a direct current input terminal of the power conversion circuit is configured to be connected to a photovoltaic module or an energy storage battery through the positive direct current bus and the negative direct current bus, and an alternating current output terminal of the power conversion circuit is configured to be connected to a grid through the relay; and
the controller is configured to: when the positive direct current bus has a short circuit to ground, and when the grid voltage is in a positive half cycle, control the relay to be switched on, and when the grid voltage is in a negative half cycle, control the relay to be switched off; or
the controller is configured to: when the negative direct current bus has a short circuit to ground, and when the grid voltage is in the negative half cycle, control the relay to be switched on, and when the grid voltage is in the positive half cycle, control the relay to be switched off.

2. The power converter according to claim 1, wherein the power conversion circuit comprises a switch bridge arm, the switch bridge arm comprises an upper half bridge arm and a lower half bridge arm, the upper half bridge arm is connected to the positive direct current bus, and the lower half bridge arm is connected to the negative direct current bus; and
the controller is configured to: when the positive direct current bus has a short circuit to ground, first switch off the upper half bridge arm, and then switch off the relay when the grid voltage is in the negative half cycle; or the controller is configured to: when the negative direct current bus has a short circuit to ground, first switch off the lower half bridge arm, and then switch off the relay when the grid voltage is in the positive half cycle.

3. The power converter according to claim 1, wherein
the controller is configured to: when the positive direct current bus has a short circuit to ground, first switch off the switch bridge arm, and then switch off the relay when the grid voltage is in the negative half cycle; or
the controller is configured to: when the negative direct current bus has a short circuit to ground, first switch off the switch bridge arm, and then switch off the relay when the grid voltage is in the positive half cycle.

4. The power converter according to claim 1, wherein the relay comprises a phase-A relay, a phase-B relay, and a phase-C relay; and
the controller is configured to: when the positive direct current bus has a short circuit to ground,, switch off the phase-A relay when a phase-A grid voltage is in the negative half cycle; switch off the phase-B relay when a phase-B grid voltage is in the negative half cycle; and switch off the phase-C relay when a phase-C grid voltage is in the negative half cycle; or
the controller is configured to: when the negative direct current bus has a short circuit to ground, switch off the phase-A relay when the phase-A grid voltage is in the positive half cycle; switch off the phase-B relay when the phase-B grid voltage is in the positive half cycle; and switch off the phase-C relay when the phase-C grid voltage is in the positive half cycle.

5. The power converter according to claim 2, wherein the relay comprises a phase-A relay, a phase-B relay, and a phase-C relay; and
the controller is configured to: when the positive direct current bus has a short circuit to ground,, switch off the phase-A relay when a phase-A grid voltage is in the negative half cycle; switch off the phase-B relay when a phase-B grid voltage is in the negative half cycle; and switch off the phase-C relay when a phase-C grid voltage is in the negative half cycle; or
the controller is configured to: when the negative direct current bus has a short circuit to ground, switch off the phase-A relay when the phase-A grid voltage is in the positive half cycle; switch off the phase-B relay when the phase-B grid voltage is in the positive half cycle; and switch off the phase-C relay when the phase-C grid voltage is in the positive half cycle.

6. The power converter according to claim 3, wherein the relay comprises a phase-A relay, a phase-B relay, and a phase-C relay; and
the controller is configured to: when the positive direct current bus has a short circuit to ground,, switch off the phase-A relay when a phase-A grid voltage is in the negative half cycle; switch off the phase-B relay when a phase-B grid voltage is in the negative half cycle; and switch off the phase-C relay when a phase-C grid voltage is in the negative half cycle; or
the controller is configured to: when the negative direct current bus has a short circuit to ground, switch off the phase-A relay when the phase-A grid voltage is in the positive half cycle; switch off the phase-B relay when the phase-B grid voltage is in the positive half cycle; and switch off the phase-C relay when the phase-C grid voltage is in the positive half cycle.

7. The power converter according to claim 4, wherein the controller is configured to control the relay to be switched off, when neither the positive direct current bus nor the negative direct current bus has a short circuit to ground, and a current flowing through the switch bridge arm is greater than a preset value.

8. The power converter according to claim 4, wherein the controller is configured to switch off the phase-A relay when the positive direct current bus has a short circuit to ground, and a duration for which the phase-A grid voltage is in the negative half cycle for the first time is greater than a minimum duration for switching off the phase-A relay; or the controller is configured to: when the positive direct current bus has a short circuit to ground, and the duration for which the phase-A grid voltage is in the negative half cycle for the first time is less than the minimum duration for switching off the phase-A relay, switch off the phase-A relay when the phase-A grid voltage is in the negative half cycle again;

the controller is configured to switch off the phase-B relay when the positive direct current bus has a short circuit to ground, and a duration for which the phase-B grid voltage is in the negative half cycle for the first time is greater than a minimum duration for switching off the phase-B relay; or the controller is configured to: when the positive direct current bus has a short circuit to ground, and the duration for which the phase-B grid voltage is in the negative half cycle for the first time is less than the minimum duration for switching off the phase-B relay, switch off the phase-B relay when the phase-B grid voltage is in the negative half cycle again; and the controller is configured to switch off the phase-C relay when the positive direct current bus has a short circuit to ground, and a duration for which the phase-C grid voltage is in the negative half cycle for the first time is greater than a minimum duration for switching off the phase-C relay; or the controller is configured to: when the positive direct current bus has a short circuit to ground, and the duration for which the phase-C grid voltage is in the negative half cycle for the first time is less than the minimum duration for switching off the phase-C relay, switch off the phase-C relay when the phase-C grid voltage is in the negative half cycle again.

9. The power converter according to claim 5, wherein the controller is configured to switch off the phase-A relay when the positive direct current bus has a short circuit to ground, and a duration for which the phase-A grid voltage is in the negative half cycle for the first time is greater than a minimum duration for switching off the phase-A relay; or the controller is configured to: when the positive direct current bus has a short circuit to ground, and the duration for which the phase-A grid voltage is in the negative half cycle for the first time is less than the minimum duration for switching off the phase-A relay, switch off the phase-A relay when the phase-A grid voltage is in the negative half cycle again;

the controller is configured to switch off the phase-B relay when the positive direct current bus has a short circuit to ground, and a duration for which the phase-B grid voltage is in the negative half cycle for the first time is greater than a minimum duration for switching off the phase-B relay; or the controller is configured to: when the positive direct current bus has a short circuit to ground, and the duration for which the phase-B grid voltage is in the negative half cycle for the first time is less than the minimum duration for switching off the phase-B relay, switch off the phase-B relay when the phase-B grid voltage is in the negative half cycle again; and the controller is configured to switch off the phase-C relay when the positive direct current bus has a short circuit to ground, and a duration for which the phase-C grid voltage is in the negative half cycle for the first time is greater than a minimum duration for switching off the phase-C relay; or the controller is configured to: when the positive direct current bus has a short circuit to ground, and the duration for which the phase-C grid voltage is in the negative half cycle for the first time is less than the minimum duration for switching off the phase-C relay, switch off the phase-C relay when the phase-C grid voltage is in the negative half cycle again.

10. The power converter according to claim 4, wherein the controller is configured to switch off the phase-A relay when the negative direct current bus has a short circuit to ground, and a duration for which the phase-A grid voltage is in the negative half cycle for the first time is greater than a minimum duration for switching off the phase-A relay; or the controller is configured to: when the negative direct current bus has a short circuit to ground, and the duration for which the phase-A grid voltage is in the negative half cycle for the first time is less than the minimum duration for switching off the phase-A relay, switch off the phase-A relay when the phase-A grid voltage is in the negative half cycle again;

the controller is configured to switch off the phase-B relay when the negative direct current bus has a short circuit to ground, and a duration for which the phase-B grid voltage is in the negative half cycle for the first time is greater than a minimum duration for switching off the phase-B relay; or the controller is configured to: when the negative direct current bus has a short circuit to ground, and the duration for which the phase-B grid voltage is in the negative half cycle for the first time is less than the minimum duration for switching off the phase-B relay, switch off the phase-B relay when the phase-B grid voltage is in the negative half cycle again; and the controller is configured to switch off the phase-C relay when the negative direct current bus has a short circuit to ground, and a duration for which the phase-C grid voltage is in the negative half cycle for the first time is greater than a minimum duration for switching off the phase-C relay; or the controller is configured to: when the negative direct current bus has a short circuit to ground, and the duration for which the phase-C grid voltage is in the negative half cycle for the first time is less than the minimum duration for switching off the phase-C relay, switch off the phase-C relay when the phase-C grid voltage is in the negative half cycle again.

11. The power converter according to claim 5, wherein the controller is configured to switch off the phase-A relay when the negative direct current bus has a short circuit to ground, and a duration for which the phase-A grid voltage is in the negative half cycle for the first time is greater than a minimum duration for switching off the phase-A relay; or the controller is configured to: when the negative direct current bus has a short circuit to ground, and the duration for which the phase-A grid voltage is in the negative half cycle for the first time is less than the minimum duration for switching off the phase-A relay, switch off the phase-A relay when the phase-A grid voltage is in the negative half cycle again;

the controller is configured to switch off the phase-B relay when the negative direct current bus has a short circuit to ground, and a duration for which the phase-B grid voltage is in the negative half cycle for the first time is greater than a minimum duration for switching off the phase-B relay; or the controller is configured to: when the negative direct current bus has a short circuit to ground, and the duration for which the phase-B grid voltage is in the negative half cycle for the first time is less than the minimum duration for switching off the phase-B relay, switch off the phase-B relay when the phase-B grid voltage is in the negative half cycle again; and the controller is configured to switch off the phase-C relay when to the negative direct current bus has a short circuit to ground, and a duration for which the phase-C grid voltage is in the negative half cycle for the first time is greater than a minimum duration for switching off the phase-C relay; or the controller is configured to: when the negative direct current bus has a short circuit to ground, and the duration for which the phase-C grid voltage is in the negative half cycle for the first time is less than the minimum duration for switching off the phase-C relay, switch off the phase-C relay when the phase-C grid voltage is in the negative half cycle again.

12. A protection method for a short circuit to ground on a direct current side of a power converter, the method comprising:

when a positive direct current bus has a short circuit to ground, switching off a relay when a grid voltage is in a negative half cycle; and when a negative direct current bus has a short circuit to ground, switching off the relay when the grid voltage is in a positive half cycle, wherein a photovoltaic module or an energy storage battery is connected to a direct current input terminal of a power conversion circuit through the positive direct current bus and the negative direct current bus, an alternating current output terminal of the power conversion circuit is connected to one end of the relay, and the other end of the relay is connected to a grid.

13. The protection method for a short circuit to ground on a direct current side of a power converter according to claim 12, further comprising:

when the positive direct current bus has a short circuit to ground, first switching off a semiconductor switch of an upper half bridge arm of the power conversion circuit, and then switching off the relay when the grid voltage is in the negative half cycle; or when the negative direct current bus has a short circuit to ground, first switching off a semiconductor switch of a lower half bridge arm of the power conversion circuit, and then switching off the relay when the grid voltage is in the positive half cycle, wherein the upper half bridge arm of the power conversion circuit is connected to the positive direct current bus, and the lower half bridge arm of the power conversion circuit is connected to the negative direct current bus.

14. The protection method for a short circuit to ground on a direct current side of a power converter according to claim 12, further comprising:

when the positive direct current bus has a short circuit to ground, first switching off all semiconductor switches of the power conversion circuit, and then switching off the relay when the grid voltage is in the negative half cycle; or when the negative direct current bus has a short circuit to ground, first switching off all semiconductor switches of the power conversion circuit, and then switching off the relay when the grid voltage is in the positive half cycle, wherein an upper half bridge arm of the power conversion circuit is connected to the positive direct current bus, and a lower half bridge arm of the power conversion circuit is connected to the negative direct current bus.

15. The protection method for a short circuit to ground on a direct current side of a power converter according to any one of claim 12, further comprising:

switching off the relay when the positive direct current bus has a short circuit to ground, and a duration for which the grid voltage is in the negative half cycle for the first time is greater than a minimum duration for switching off the relay; or when the positive direct current bus has a short circuit to ground, and a duration for which the grid voltage is in the negative half cycle for the first time is less than the minimum duration for switching off the relay, switching off the relay when the grid voltage is in the negative half cycle again.

16. The protection method for a short circuit to ground on a direct current side of a power converter according to claim 13, further comprising:

switching off the relay when the positive direct current bus has a short circuit to ground, and a duration for which the grid voltage is in the negative half cycle for the first time is greater than a minimum duration for switching off the relay; or when the positive direct current bus has a short circuit to ground, and a duration for which the grid voltage is in the negative half cycle for the first time is less than the minimum duration for switching off the relay, switching off the relay when the grid voltage is in the negative half cycle again.

17. The protection method for a short circuit to ground on a direct current side of a power converter according to claim 14, further comprising:

switching off the relay when the positive direct current bus has a short circuit to ground, and a duration for which the grid voltage is in the negative half cycle for the first time is greater than a minimum duration for switching off the relay; or when the positive direct current bus has a short circuit to ground, and a duration for which the grid voltage is in the negative half cycle for the first time is less than the minimum duration for switching off the relay, switching off the relay when the grid voltage is in the negative half cycle again.

18. The protection method for a short circuit to ground on a direct current side of a power converter according to claim 12, further comprising:

switching off the relay when the negative direct current bus has a short circuit to ground, and a duration for which the grid voltage is in the positive half cycle for the first time is greater than a minimum duration for switching off the relay; or when the negative direct current bus has a short circuit to ground, and a duration for which the grid voltage is in the positive half cycle for the first time is less than the minimum duration for switching off the relay, switching off the relay when the grid voltage is in the positive half cycle again.

19. The protection method for a short circuit to ground on a direct current side of a power converter according to any one of claim 13, further comprising:

switching off the relay when the negative direct current bus has a short circuit to ground, and a duration for which the grid voltage is in the positive half cycle for the first time is greater than a minimum duration for switching off the relay; or when the negative direct current bus has a short circuit to ground, and a duration for which the grid voltage is in the positive half cycle for the first time is less than the minimum duration for switching off the relay, switching off the relay when the grid voltage is in the positive half cycle again.

20. The protection method for a short circuit to ground on a direct current side of a power converter according to any one of claim 12, further comprising:

immediately switching off the relay when a current flowing through at least one semiconductor switch in the power conversion circuit is greater than a preset value, and neither the positive direct current bus nor the negative direct current bus has a short circuit to ground.

* * * * *